United States Patent [19]

Lemon et al.

[11] Patent Number: 4,674,041

[45] Date of Patent: Jun. 16, 1987

[54] METHOD AND APPARATUS FOR CONTROLLING THE DISTRIBUTION OF COUPONS

[75] Inventors: Chester L. Lemon, Dallas; Bill A. Kelly, Ft. Worth, both of Tex.

[73] Assignee: James K. Appleton, Dallas, Tex.

[21] Appl. No.: 533,060

[22] Filed: Sep. 15, 1983

[51] Int. Cl.⁴ .......................... G07B 1/02; G07F 7/08; G07F 7/00; G06F 15/24

[52] U.S. Cl. .................................. 364/401; 364/900; 364/400; 235/381; 235/382

[58] Field of Search ............... 364/401, 400, 478, 479, 364/200 MS File, 900 MS File; 235/379, 380, 381, 382

[56] References Cited

U.S. PATENT DOCUMENTS

| | | | |
|---|---|---|---|
| 3,505,646 | 4/1970 | Appel et al. | 364/900 |
| 3,959,624 | 5/1976 | Kaslow | 235/494 |
| 4,186,438 | 1/1980 | Benson et al. | 364/200 |
| 4,247,759 | 1/1981 | Yuris et al. | 235/493 |
| 4,412,631 | 11/1983 | Haker | 221/66 |
| 4,449,186 | 5/1984 | Kelley et al. | 364/407 |
| 4,484,302 | 9/1984 | Cason et al. | 364/900 |
| 4,554,446 | 11/1985 | Murphy et al. | 235/487 |

FOREIGN PATENT DOCUMENTS

| | | | |
|---|---|---|---|
| 1437883 | 4/1974 | United Kingdom | 364/200 |
| 2105075 | 3/1983 | United Kingdom | 235/381 |

OTHER PUBLICATIONS

PCT Search Report, WO/85/01373, Lemon, Chester and Kelly, Bill A.

Primary Examiner—Joseph Ruggiero
Assistant Examiner—Charles B. Meyer
Attorney, Agent, or Firm—Pravel, Gambrell, Hewitt & Kimball

[57] ABSTRACT

A system for monitoring and controlling the distribution of product coupons from a plurality of remote terminals located at the point of sale is provided. The system includes video display terminals for displaying an array of coupons available for selection and means for monitoring and controlling the number of coupons distributed.

31 Claims, 33 Drawing Figures

EAN EAN EAN EAN EAN EAN EAN EAN EAN EAN EAN EAN

EXPIRES 15-MAY-83

SAVE 25¢　　SAVE 25¢ ON
PILLSBURY　　PILLSBURY PLUS
PLUS　　　　　CAKE MIX
CAKE MIX　　　(ANY FLAVOR)
MAIL TO　　　　CASH VALUE
THE PILLSBURY CO.　1/20 OF 1 CENT
BOX 802　　　　4-07-656
MINNEAPOLIS MN　STORE COUPON
55460

EAN EAN EAN EAN EAN EAN EAN EAN EAN EAN EAN

FIG. 3b

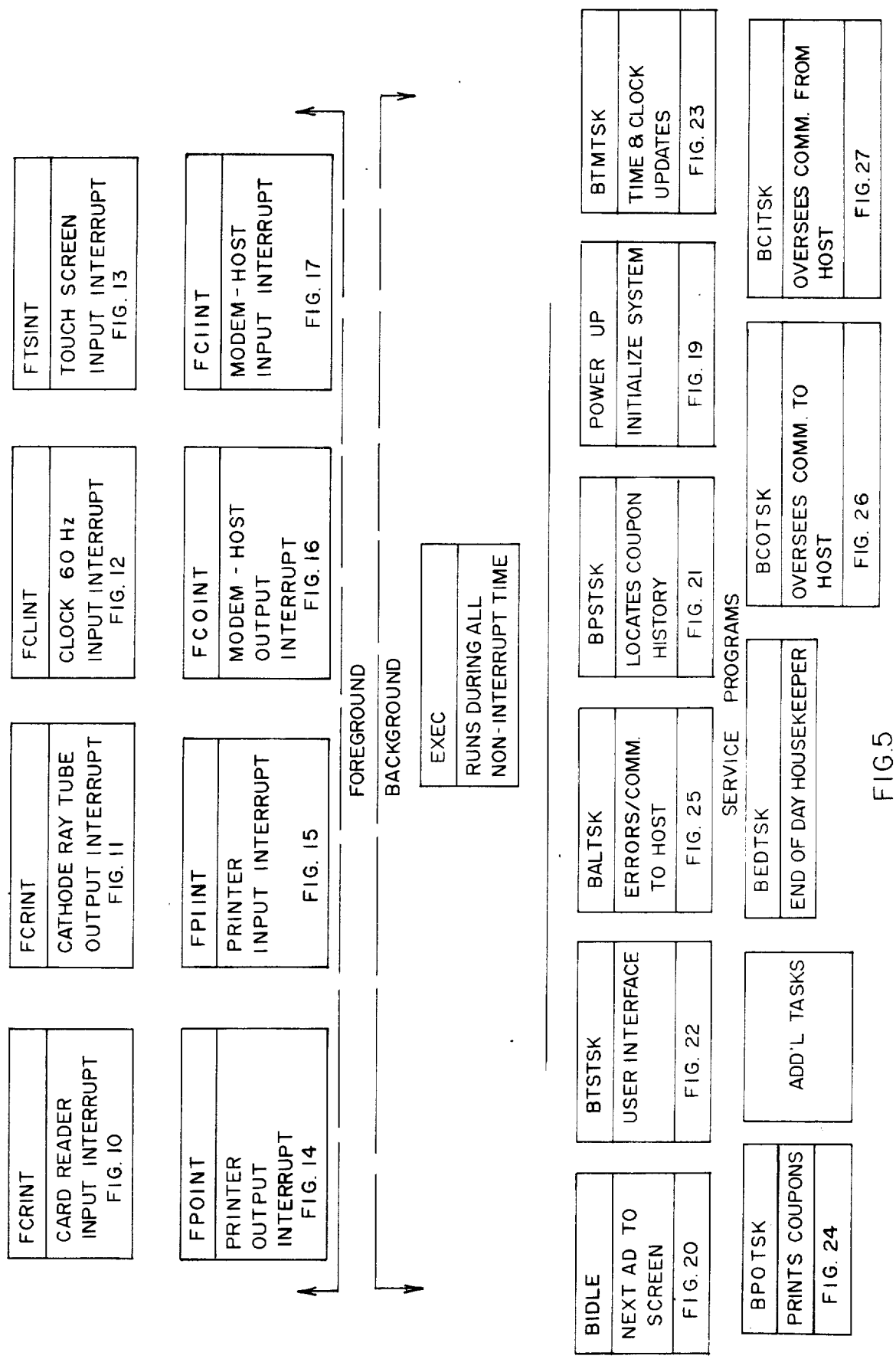

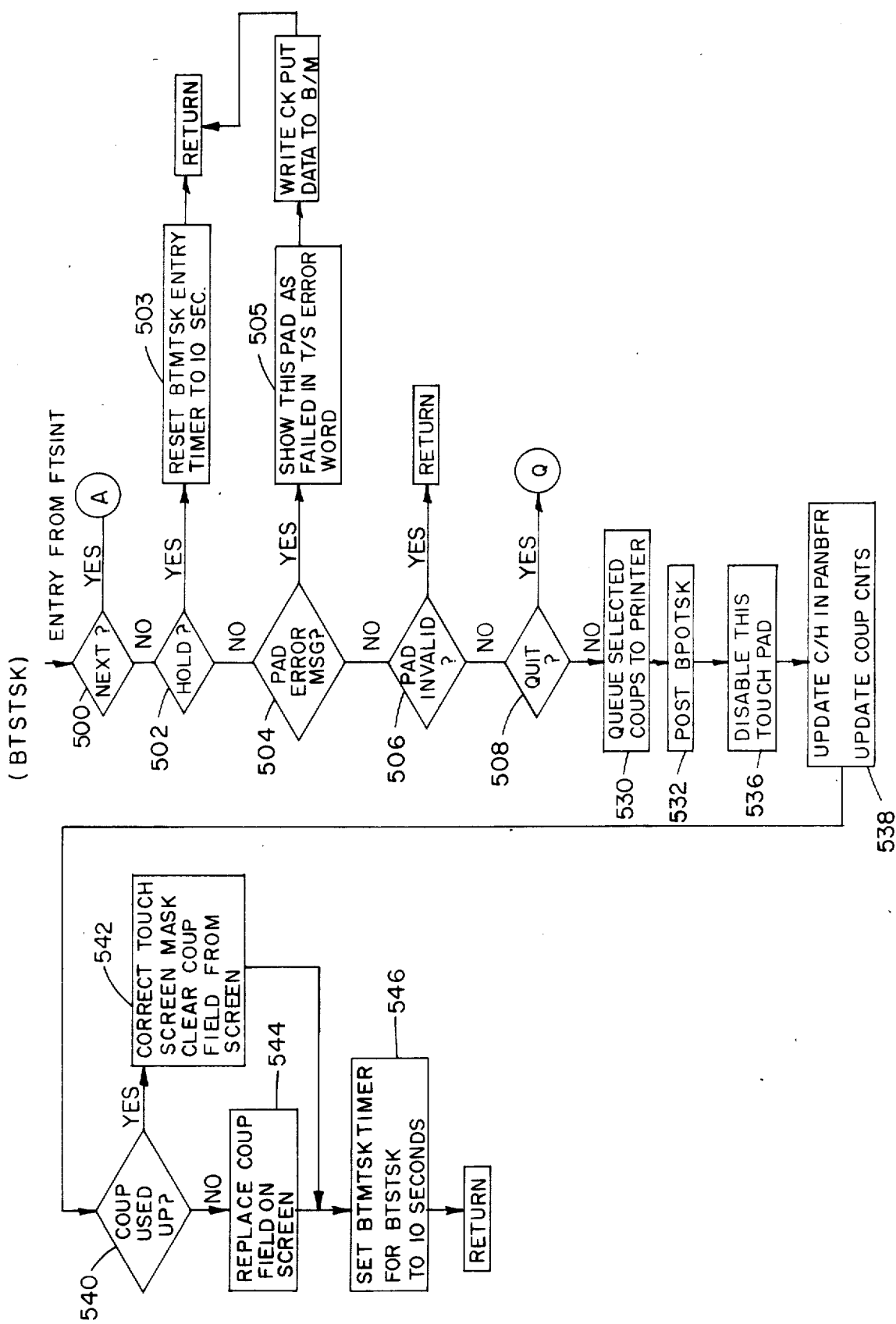

METHOD AND APPARATUS FOR CONTROLLING THE DISTRIBUTION OF COUPONS

BACKGROUND OF THE INVENTION

1. Field of Invention

The present invention relates to a method and apparatus for distributing coupons or other redemption certificates for retail sales of merchandise, such as groceries and dry goods and to a method and apparatus for monitoring and controlling the number of such coupons issued and/or redeemed.

2. Description of the Prior Art

In the past, it was a common marketing scheme for manufacturers to distribute large numbers of coupons or similar redemption certificates in local newspapers or other productions distributed to the general public. These coupons typically included an advertisement for the particular product and provided a discount off the regular price if presented at a participating grocery store at the time of purchase. Coupons redeemed at the various retail outlets were sent to a national clearing house which calculated the amount due to the retailers and billed the manufacturers for the portion due on account of sales of their respective products. While the distribution of coupons was generally regarded as a good advertising and marketing technique, the prior art methods of coupon distribution and redemption had serious drawbacks for the manufacturers. For example, the only way redemption has been at all measured is by prior studies, which shows an average redemption to be about 3%. Actual redemption could not be controlled. It was possible that a particular manufacturer's coupon could have an unexpectedly high redemption and cost much more than anticipated.

Furthermore, the prior art method of distribution lent itself to fraudulent practices both by the individual redeeming coupons at a retail store and by the retail outlet itself. For example, an individual purchasing a large amount of groceries during peak business hours at a particular store could have easily been credited for coupons or products they had not actually purchased because of the inconvenience to the store employee of checking each item versus the coupons. The retail stores would, in such circumstances, routinely present all coupons, including those erroneously redeemed, to the national clearing house for payment. It was also possible for store employees to obtain cash for coupons without purchasing the products. In all of these circumstances, the manufacturer was held responsible for the value of the coupon without having made a sale of the product.

SUMMARY OF THE INVENTION

In contrast to the prior art methods and apparatus, the method and apparatus of the present invention provides an unique, controlled coupon advertisement and distribution system which enables the manufacturer to control its liability for coupons and to deter fraudulent redemption. In the method and apparatus of the present invention, the manufacturer may prescribe a particular number of coupons to be redeemed collectively and at each particular retail store. The present invention also greatly reduces the possibility of fraud by enabling coupons to be encoded with store identification numbers, expiration dates, uniform product codes, and other information at the point of distribution. By providing point of sale distribution and same day expiration dates the system of the present invention also provides substantial inprovement in the manufacturer's coupon redemption rate as compared to the three percent rate experienced in the past.

A stand alone coupon dispensing terminal is provided at each retail store. Each stand alone terminal communicates with a host central processing unit located remote from the stores. Coupons are displayed for customer selection at each dispensing terminal on a video menu via a cathode ray tube and touch screen combination in a fashion which enhances customer acceptance by reducing the time necessary to select and obtain coupons. Each terminal may be monitored and controlled via the host computer to obtain data such as the number of coupons issued and the identification of customers using the terminal. The system enables the manufacturer to limit the number of a particular coupon issued from a terminal as well as the number issued in response to activation by a particular credit card. Each terminal includes a self-contained high speed coupon printer which prints the product information, date, time of day, uniform product code, expiration date, a store identification number or any other information desired for particular applications on each coupon issued. The features of the method and apparatus of this invention are too many to mention in this summary. The specification to follow and the claims will particularly point out this invention.

In summary, the present invention provides great benefits to the product manufacturers by enabling the manufacturer to control its maximum liability and reducing the potential for fraud, and benefits the consuming public by providing a convenient means for obtaining coupons at the point of purchase only for those items they desire to buy at the time, thereby eliminating the need to clip and save coupons from the newspapers or other advertisements.

BRIEF DESCRIPTION OF THE DRAWINGS

FIG. 3b is a typical coupon printed by the system of this invention.

FIGS. 5-9 are schematic flow chart diagrams for the general operation of the remote dispensing terminal computers of FIG. 2 to achieve the desired results of the present invention.

FIGS. 10-21, 22a-c, 23, 24a and b, 25, 26, 27a and b, and 28 are schematic flow chart diagrams for achieving the particular tasks in the general operations illutrated in FIGS. 5-9.

DESCRIPTION OF THE PREFERRED EMBODIMENTS

Table of Contents

I. System Overview
II. Description of the Distribution System
III. Terminal Components IV. Description of the Operation of the Dispensing Terminals
V. Conclusion
  A. Operational Modes: General Logic
  B. Detailed Description of Command Sub-Sequences
    1. The Executive Sequence
    2. The Foreground Sub-Sequences
      a. Card Reader Interrupt
      b. Interrupt From the Output to the Cathode Ray Tube
      c. Interrupt from Clock
      d. Touch Screen Interrupt
      e. Printer Output Interrupt (FPOINT)
      f. Printer Input Interrupt (FPIINT)
      g. Modem Output Interrupt (FCOINT)
      h. Modem Input Interrupt (FCIINT)
    3. The Background Task Sub-Sequence
      a. Background Idle Loop Sequence (BIDLE)
      b. Customer Account Number Search Task (BPSTSK)
      c. Touch Screen Task (BTSTSK)
      d. Timer Task (BTMTSK)
      e. Printer Output Task (BPOTSK)
      f. Alarm Task (BALTSK)
      g. Data Transmission to Host H
      h. Terminal Control Via Host H

I. System Overview

Figure 1:
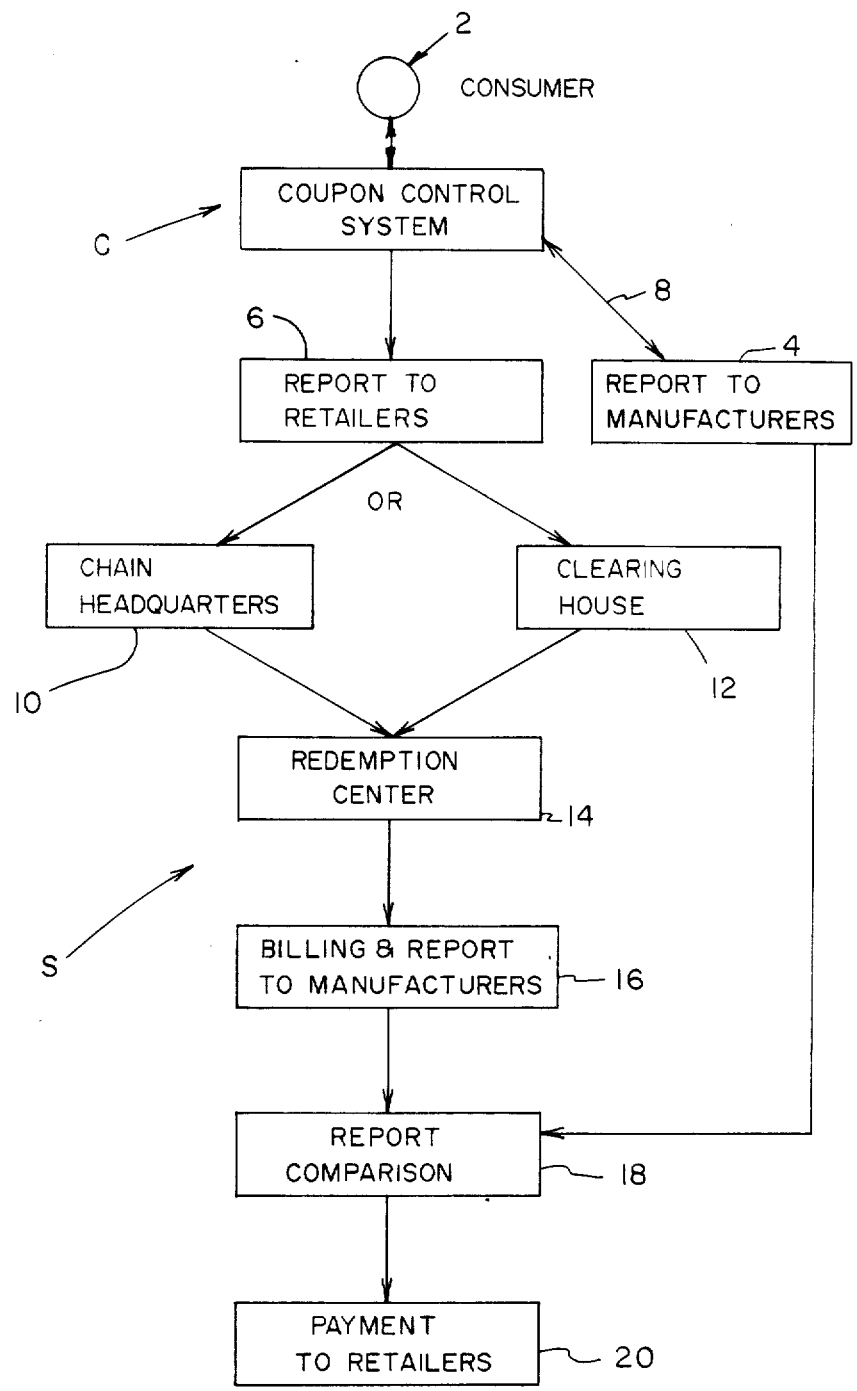
FIG. 1 is a schematic diagram of a system and its role in the over-all coupon reporting and redemption process.

Referring now to FIG. 1, the coupon distribution system of the present invention is illustrated in schematic form in its role in the over-all coupon reporting and redemption process, and designated generally by the letter S. The system S includes a coupon control system C of the present invention which interacts with the consumer 2 to selectively dispense coupons as requested. System C also generates reports 4 and 6 regarding coupon distribution for the manufacturers and retailers, respectively.

In the system of the present invention, the manufacturer is able to prescribe limits for distribution of particular coupons on a collective and per store basis. This feature is illustrated schematically in FIG. 1 by the bi-directional arrow 8. The report 4 is provided to the manufacturer on a periodic basis, such as a weekly basis and includes coupon distribution information for each retail outlet. Report 4 may include the number of coupons dispensed, the store identification information, the dates and times of distribution, and customer identification data. This information is valuable to the manufacturer both as an aid in analyzing its marketing techniques and in detecting fraudulent coupon distribution or redemption. The report 6 provided to retailers is essentially like report 4 but includes informaton only as to the particular retail store(s) involved.

Typically, retailers forward the report 6 to a retail chain headquarters 10 or a clearing house 12 to provide a collective accounting for the retail chain or region. In either event, the coupon distribution information is presented to a redemption center 14 which receives such information from retailers throughout the country and prepares a billing statement and report 16 for each participating manufacturer.

The reports 16 and 4 are compared at step 18 to detect errors or fraudulent claims. For example, if the number of coupons presented for redemption exceed the number of coupons dispensed as noted in report 4, the manufacturer may refuse to make payment to the retailers for the excess. Once the system of the present invention is utilized, such discrepancy will be minimized since the manufacturer will be able to pin point and investigate error sources. The manufacturer will make payment to the particular retailers at step 20 thereby concluding the periodic, quarterly, monthly or weekly transaction.

In this fashion, the manufacturer is able to precisely control the number of coupons dispensed on a collective and per store basis and to monitor coupon redemption to prevent fraud. The details of the system S are included in the remaining figures of the drawings and the accompanying description.

II. Description of the Distribution System

Figure 2:
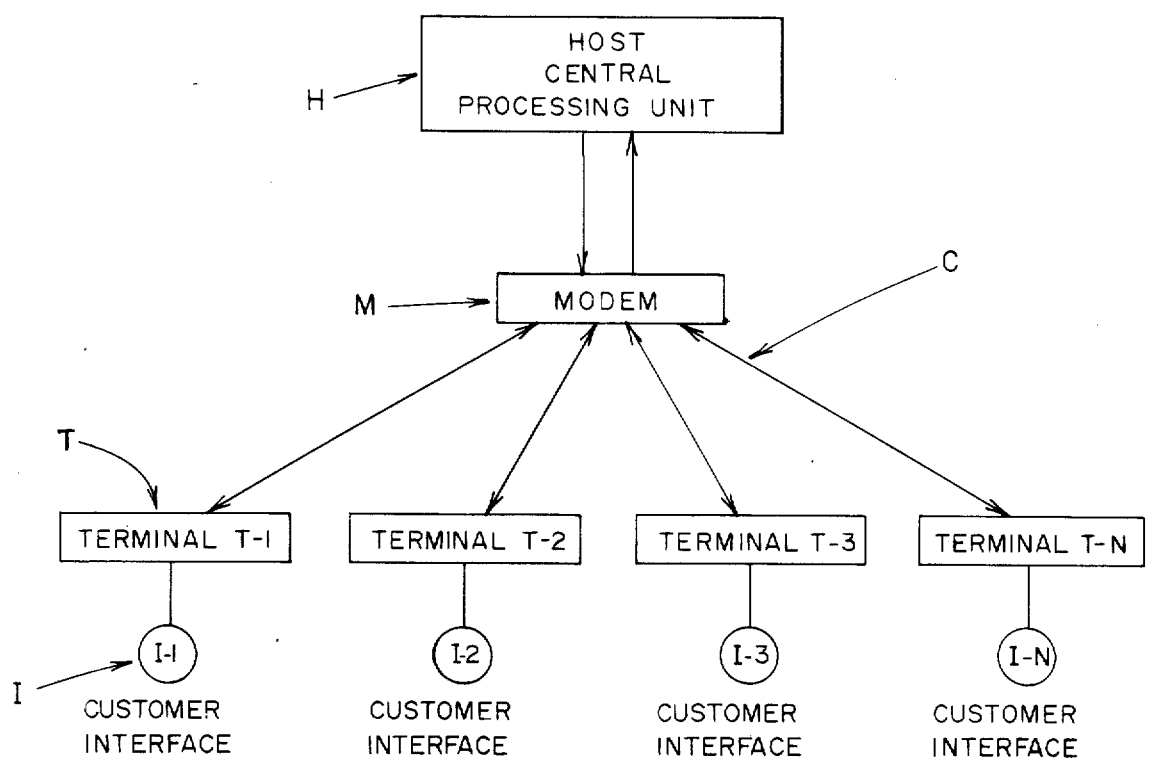
FIG. 2 is a schematic diagram of the system for controlling the distribution and redemption of coupons according to the present invention of FIG. 1.

Referring now to FIG. 2, the coupon control system C is generally illustrated in schematic block diagram form. System C includes a host central processing unit H which communicates with a number of coupon dispensing terminals T, designated T-1 through T-N, via a conventional telecommunications modem M. Each terminal T includes a corresponding customer interface I, designated I-1 through I-N.

Host computer H may be any programmable central processing unit having suitable data storage and processing capabilities to perform the functions described in detail hereinafter. Selection of a particular central processing unit depends upon the needs of the particular distribution system and, given the description contained herein, is a matter within the ordinary skill in the art. In one application, a Digital Equipment Corporation 11T23 System has been used to perform the function of the host computer H and has performed satisfactorily. Other suitably programmed computers having similar architecture could likewise be employed.

Host computer H monitors the operation of the individual terminals T and provides terminals T with the information necessary to dispense the coupons requested by customers. Host computer H stores the data which constitutes the array of coupons available for selection which will be displayed on each terminal T. Thus, the operator is able to control the display of coupons at each and every remote terminal T via host computer H. Host computer H also retains other information such as the date and time of day which is used by the terminals T to achieve the desired results of the present invention. This information is provided to the terminals T in the manner described hereinafter. Host computer H also is programmed to interact with terminals T to allow the operator to prescribe per store and collective limits for each coupon thereby controlling the manufacturers liability.

Most importantly, host computer H is programmed to receive from the terminals T coupon transaction information including the number and type of coupons dispensed, store identification numbers, and customer account numbers. Host computer H is programmed to use the information to generate the weekly reports 4 and 6 (FIG. 1) for the manufacturer and retailer, respectively. Programming of the host computer H, given the operational specifications for the host contained herein, and the detailed specification of programming for terminals T described herein, is a matter of ordinary skill in the art of computer programming and hence need not be described herein in detail.

Figure 3A:
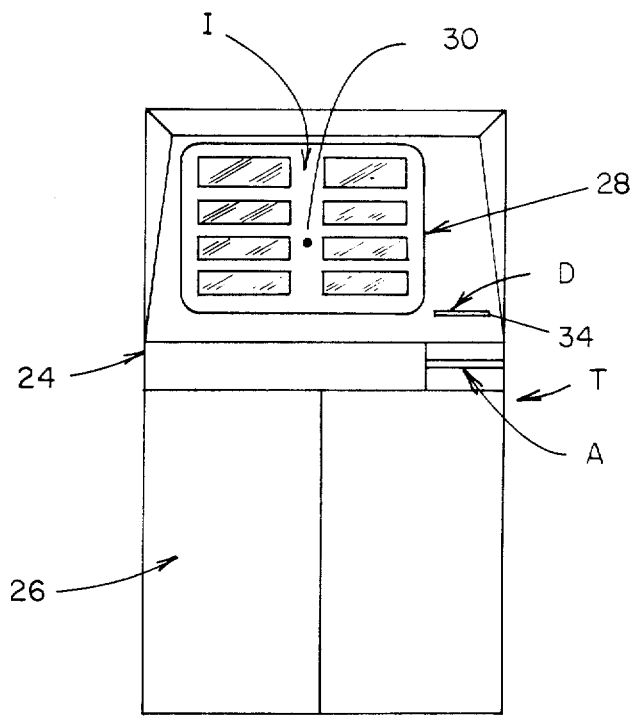
FIG. 3a is a perspective view of a coupon dispensing terminal which forms part of the system of FIG. 2.

Each of terminals T (FIG. 3) is a stand-alone unit to be placed at a remote location such as in a retail grocery store. Terminals T include a customer interface display I, a coupon dispensing apparatus D, and an activator A (FIG. 3). Terminals T also include a central processing unit such as a microcomputer 22 and the associated peripheral circuitry illustrated schematically in FIG. 4. A terminal housing 24 is provided to enclose the terminal hardware and also to provide storage space in lower cabinet 26 for conveniently storing extra paper for coupons or other materials.

Customer interface display I includes a conventional cathode ray tube 28 for displaying the video menu of coupons available for selection as well as other video graphics, such as advertisements, in response to signals received from microcomputer 22. Overlaying cathode ray tube 28 is a transparent, touch sensitive screen 30 which includes an array of touch activated switches arranged in a regular array to overlay particular coupons displayed on cathode ray tube 28. In the preferred embodiment, a screen having an array of thirty-two (32) switches such as the Model Number TK120S manufactured by Interaction Systems, Inc. is used. Other commonly available and suitable touch sensitive screens may also be employed. In the preferred embodiment, the coupons and switches are arranged so that two switches overlay each coupon to make selection by the customer less troublesome. Other switches incorporated in the touch screen array do not correspond to particular coupons but to functions which permit the customer to: (1) hold the page presently being displayed for an additional time period, ie., ten seconds; (2) cause the terminal T to display the next page of the video menu immediately, and (3) quit the selection process prior to reviewing the entire menu.

As will be described in detail below, microcomputer 22 will cause terminal T to sequentially display in page format an entire menu of coupons available for selection. If after a prescribed period of time no selection has been made, microcomputer 22 will cause terminal T to display the next page of coupons and so on until the entire menu has been completed. If no selection has been made throughout the the display process after a prescribed time period, microcomputer 22 causes terminal T to deactivate from the coupon dispensing mode, and begin displaying full page advertisements in a free-standing mode until such time as a customer reactivates terminal T via activator A.

Activator A is a conventional magnetic card reading apparatus adapted to read the data encoded on magnetic tape used in common consumer credit cards. Activator A provides a signal to activate terminal T to the coupon dispensing mode whenever a credit card having an encoded magnetic tape strip is inserted therein. Any of the common bank, gasoline or retail credit cards will activate the terminal T. While this does not prevent a single customer having more than one credit card from repeatedly using the terminal T, use of a credit card activator provides the informational capability as described below to somewhat limit the number of unauthorized transactions and further prevents children from activating the machine.

As will be described hereinafter, terminal T displays only those coupons currently available to the particular customer. Upon activation, terminal T determines whether the same credit card account number has been used within the last week or other predesignated period by comparing the present credit card number with those stored in memory in microcomputer 22. If so, microcomputer 22 permits only those coupons still available for selection by that particular customer account number to be displayed. If, for example, the manufacturer has prescribed a one per customer limit for a coupon, and that coupon has been previously issued to the customer under the same credit account number, the coupon will not be displayed. Furthermore, even if the particular credit account number has no selection history, if the maximum number of a particular coupon either collectively or on a store by store basis have been issued, that coupon will no longer be displayed. In this fashion, a manufacturer is provided with much more control over the maximum redemption liability than the prior art method of newspaper distribution.

Coupon dispenser D includes a high speed printer 32 (FIG. 4) of the type suitable for printing on heat sensitive paper to print the coupons selected by the customer. As will be described in detail below, once a particular coupon or group of coupons has been selected, microcomputer 22 causes the data which makes up the particular coupon(s) to be transmitted to coupon printer 32 whereupon the selected coupon(s) are automatically printed and dispensed. Furthermore, if dispenser D fails to provide a signal to indicate that the particular coupon(s) have been printed within a prescribed time period, microcomputer 22 causes an error message to be forwarded to host computer H which places terminal T in the free-standing advertising mode until the problem is rectified.

In the preferred embodiment, coupons are printed on a continuous length of heat-sensitive paper and cut at the appropriate point by a combined printer and cutting machine mounted within terminal T. The coupons printed by dispenser D generally contain the product information and the discount to be applied to the regular price. The system of the present invention allows additional information to be printed on the coupon to deter fraud and to encourage prompt use of the coupon. Since dispenser D prints the coupons from data provided from host computer H via terminal T, daily updated expiration dates may be included on the coupon to set, for example, a same day expiration date to encourage immediate use of the coupon. Furthermore, electronically readable uniform product codes may be included on the coupon in the same fashion as the expiration dates or other data specified herein so that an appropriately programmed check out register can read the product code on the coupon and apply the coupon discount only if a product bearing the identical product code has been purchased. This feature prevents customers from overwhelmig the store's employees with a large number of coupons and groceries at peak business hours to obtain the benefit of the coupon discount without purchasing the corresponding product.

Coupons are conveniently dispensed to the customer via a slot 34 in the terminal housing 24 as they are printed and cut. It is a feature of the present invention that a customer may select any or all of the displayed coupons and go on to the next page of the menu without having to wait for the selected coupons to be printed. This is accomplished by providing programming and memory associated with microcomputer 22 which stores the customer's selections and prints them sequentially as soon as possible.

The video display presented on terminal T is either in a free-standing advertising mode wherein full screen advertisements for particular products are sequentially displayed or, in the coupon dispensing mode wherein a page formatted, video menu of coupons is displayed for selection by the customer. Terminal T automatically deactivates to the free-standing mode once the entire menu of coupons has been displayed and the appropriate time has elapsed. Interface I also includes a "quit" switch, not associated with a particular coupon which permits the customer to abort the normal terminal display sequence before all the coupons have been displayed. This feature frees the terminal T quickly for use by another customer without requiring the display sequence to be completed in each customer transaction, and thereby also prevents subsequent customers from selecting coupons on the previous customer's account number when the previous customer completes his selection before the entire array of coupons is presented. As will be described below, upon activation of the quit switch, microprocessor 22 causes terminal T to return to its free-standing mode prior to the completion of the normal display cycle.

It is a feature of the present invention that the terminal T automatically rotates the order in which the individual coupons are displayed on the cathode ray tube viewing screen 28 each time the terminal is activated. Thus, each particular manufacturer's coupon will appear on the first page of the menu in rotation with the remaining pages and no manufacturer is given preferential marketing treatment.

Each of the terminals T communicates with host computer H to receive updated coupon information and to transmit coupon transaction data. Microcomputer 22 in terminal T automatically establishes communication with host computer H and transfers coupon transaction data at the completion of every seventh transaction. Each transaction is defined by an activation of terminal T via activator A. The information thus provided to host computer H is utilized to compile coupon distribution reports 4 and 6 (FIG. 1) and to monitor the distribution of coupons on a continuous basis.

III. Terminal Components

Figure 4:
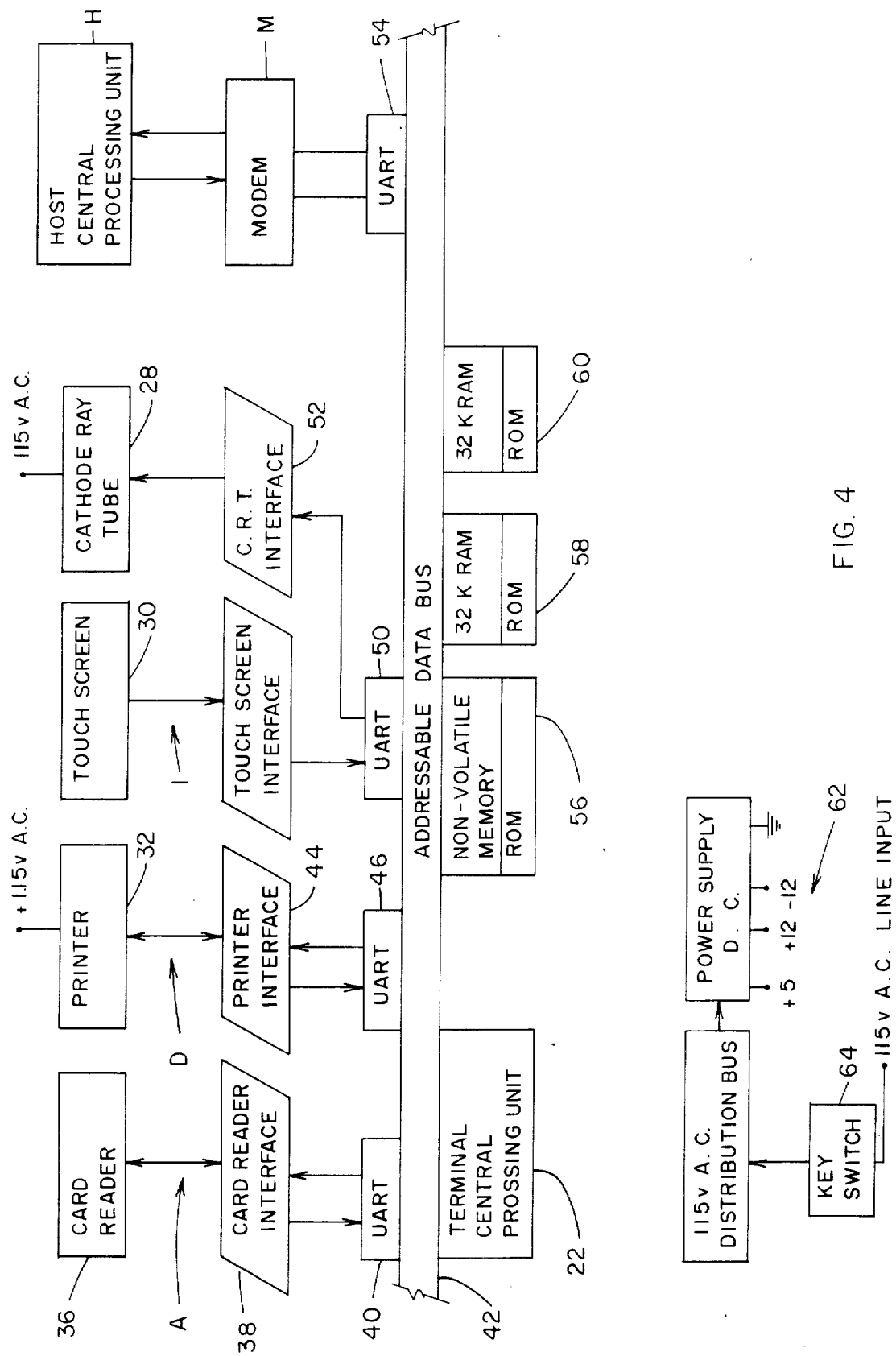
FIG. 4 is a schematic block diagram of a portion of the coupon dispensing terminal of FIG. 2 and its interface with the host central processing unit.

Further details of terminal T are shown schematically in FIG. 4. As noted above, terminal T includes an activator A, a dispenser D, a customer interface display I and a microcomputer 22 with associated peripheral circuitry. Activator A having a conventional magnetic card reading apparatus 36 for reading information from one or more of the magnetic strip tracks on standardized consumer credit cards, and a conventional card reader interface 38 for converting the digitally encoded data from reader 36 into a telecommunication conventional serial format such as ASCII for transmission to microcomputer 22.

Activator A also includes a conventional universal asynchronous receiver/transmitter (UART) 40 which enables data to be transmitted and received between microcomputer 22 and card reader interface 38 in the conventional manner. In the preferred embodiment, UART 40 as and the other UARTS described hereinafter provide a vectored interrupt signal for microcomputer 22 via addressable data bus 42 thereby identifying the source of the interrupt. An interrupt from UART 40 signals the receipt of customer credit account information for transmission to microcomputer 22.

Data bus 42 may be any suitable, addressable data communications bus, such as the Digital Equipment Corporation Q-bus.

Dispenser D includes coupon printer 32 described above, and printer interface 44 which functions similarly to card reader interface 38 to transmit signals to and from printer 32 to microcomputer 22 in digital ASCII format via UART 46.

Customer interface display I includes touch screen 30 described above and associated interface 48 and UART 50 which provide digital, ASCII communications between touch screen 30 and microcomputer 22 in the conventional manner. For example, the analog signals generated by touch screen 30 in response to customer touch selection are converted to digital, ASCII format signals by interface 48 and transmitted to microcomputer 22 via UART 50. UART 50 transmits the data which comprises the coupons or advertising information from microcomputer 32 via bus 42 to conventional cathode ray tube interface 52 which converts the digitally formatted graphics data which comprises the coupons or advertising to a format suitable for use by display cathode ray tube 28.

Full duplex communication between microcomputer 22 and host computer H is conducted via modem M and UART 54 functioning in the conventional manner.

In the illustrated embodiment (FIG. 4) microcomputer 22 is an interrupt driven central processing unit such as the Digital Equipment P.D.P. 11/2 which performs data processing functions but has no internal random access memory. Other suitable large scale integrated circuit data processing units with or without internal random access memory could be utilized as well. Associated with microcomputer 22 via bus 42 are a conventional non-volatile read only memory 56, and random access memories 58 and 60. Non-volatile memory 56 may be any suitable non-volatile memory circuit such as the QSB-11 Bubbl-Tec Corporation bubble memory having a one-hundred twenty-eight kilobyte capacity. In the system of the present invention, memory 56 is utilized to store the operating system and background programs for microcomputer 22, the graphic display data, i.e., coupon and advertisements to be displayed on the terminal screen, and current customer credit account numbers and coupon transaction history. Much of this information is duplicated in memories 58, 60 but stored in non-volatile, bubble memory 56 to ensure against loss of the information in the event of power failure.

Memories 58, 60 are conventional thirty-two kilobyte random access memory circuits having serial R.S. 232 data ports and adaptable parity and baud rates so as to be compatible with microcomputer 22 and associated peripheral devices. Memories 58, 60 are utilized by microcomputer 22 for input/output addressing functions, storing operating programming, customer account numbers, coupon and advertising data and other functions as described hereinafter in the detailed description of the microcomputer operating program.

Power supply 62 is a conventional direct current power supply suitable for providing terminal T with D.C. power at the specified levels from alternating current line voltage at the remote terminal location. Power supply 62 may also include a keyed switch 64 to allow the terminal T to be energized or de-energized only by persons having a key, such as the store manager, for example.

IV. Description of the Operation of the Dispensing Terminals

A general description of the command sequences for microcomputer 22 will be provided with references to the schematic flow charts in FIGS. 5–9. FIG. 5 illustrates the system hierarchy and relative program module priority and identifies the various sub-sequences which microcomputer 22 utilizes to achieve the functional steps set forth in FIGS. 5-9. Where necessary or appropriate, these sub-sequences will be described in detail, those not described in detail are matters within the ordinary skill in the programming art. The command sequences for microcomputer 22 are implemented under a foreground/background concept, in which foreground (realtime, interrupt-driven) programs receive on demand immediate, short term control of microcomputer 22, and background (scheduled or requested) programs run over longer periods during non-interrupt time. All interrupt, foreground command sequences are executed on demand, while sequence EXEC, the principal background sequence, and the other background sequences which are utilized by EXEC are run on available, i.e., non-interrupt time. These command sequences will be referred to hereinafter by the designations appearing in FIG. 5.

A. Operational Modes: General Logic

In general, terminals T operate in four basic modes, which are:

(1) Start up (FIG. 6), with an automatic transition to one of the following on-line modes when all start up parameters are satisfied;

(2) Normal customer (FIG. 7), with the customer recognition, coupon request and coupon print operations proceeding normally;

(3) Hide and Watch (FIG. 8), with the terminal T available for operating and advertising functions, but commanded by host computer H not to issue coupons; and (4) Modem Operations (FIG. 9), which are concurrent with the on-line modes, in which full duplex transfer with the host computer H are supported without affecting the customer interface.

The programming of microcomputer 22 can be best understood with reference to these general flow charts with the understanding that routine sub-sequences may be necessary to carry out the functions specified therein. Where the details of such subsequences are matters within the ordinary skill in the programming art, details will not be included herein.

Start up mode 70 is entered either upon command from the host computer H to re-initialize the terminal T or upon power failure at the terminal. In either event, control of microcomputer 22 is transferred to a boot-strap loading sequence 72 stored in memory 56, which causes microcomputer 22 to load the operating system command sequences from memory 56 to the first available address in combined memories 58 and 60. Hereinafter, various sequences will be described as controlling microcomputer 22. It should be understood that such sequences are actually part of the programmed software of microcomputer 22. Control of microcomputer 22 is then transferred to the sequence 74 thus stored in random access memory 58, 60 which causes microcomputer 22 to initialize cathode ray tube 28, printer 32 and modem M. Control of microcomputer 22 is then transferred to host auto-call sequence 76 which initiates a call via modem M to host H unless the start up sequence has been entered at the command of the host computer H (step 78), in which case communication has already been initiated. If the call is unsuccessful, a re-dial sequence 80 will cause microcomputer 22 to repeat the attempt every forty-five seconds. Irrespective of whether the call is successful, control of microcomputer 22 is transferred to command sequence 82 which includes command steps 84, 86 and 88 which cause the terminal T to display the first screen of advertising in the free-standing mode and to rotate to the next screen of advertisements every ten seconds. Although not illustrated in FIG. 6, it should be noted that should a customer attempt to activate the terminal T via card reader A while terminal T is operating in this start up mode, thereby causing a card reader interrupt (FIG. 5) to be provided to microcomputer 22, microcomputer 22 causes a "temporarily out of service" message to be displayed for the customer on cathode ray tube 28.

Once communication with host computer H is established (step 80), microcomputer 22 obtains date/time of day data and mode instruction (step 90) from host H. Control is then transferred to command sequences in the Ready mode (FIG. 7) or the Hide and Watch mode (FIG. 8) depending upon instruction from host computer H (step 92).

Figure 7:
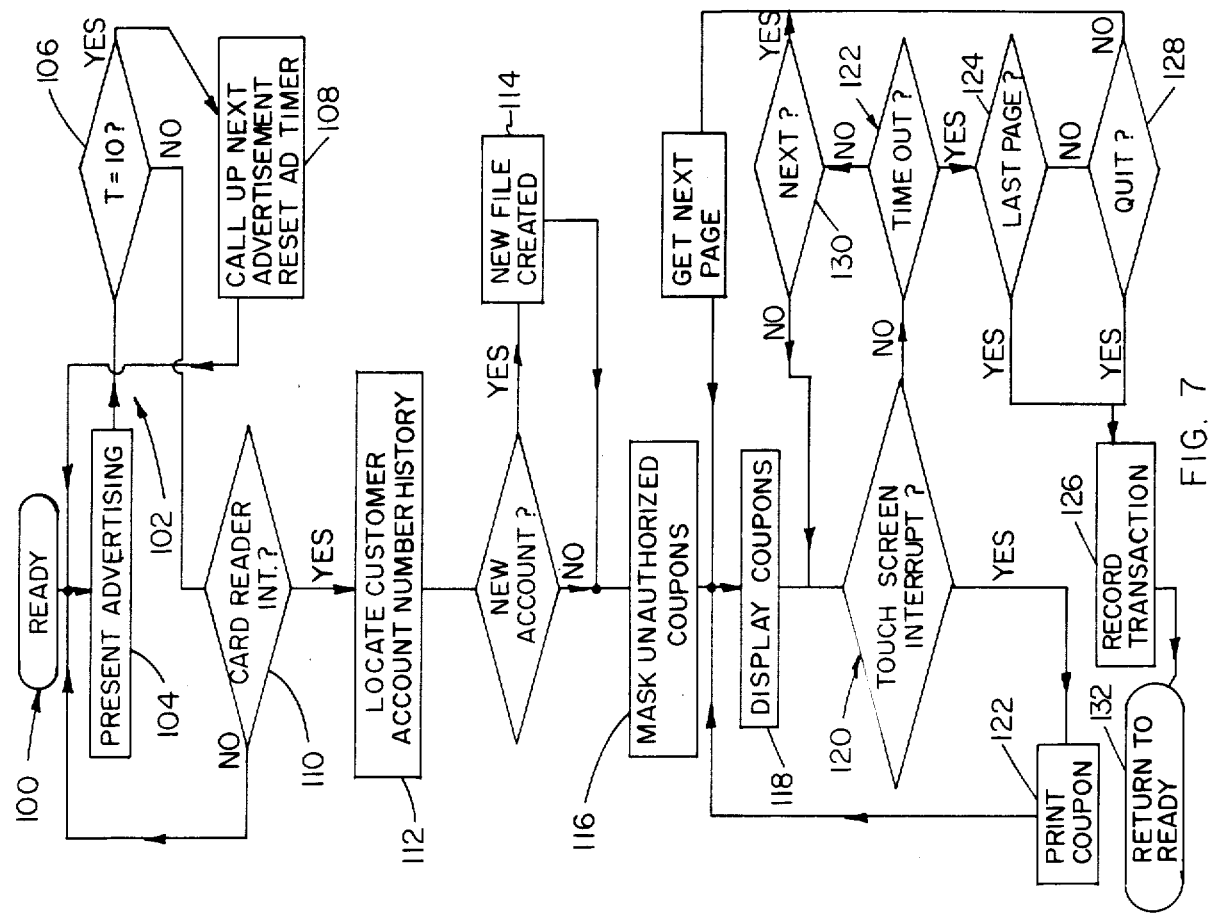

From the start up mode (FIG. 6), control of microcomputer 22 will normally be transferred to the normal customer or ready mode 100 (FIG. 7). In this mode, command sequence 102 which includes steps 104, 106 and 108, causes microcomputer 22 to display free-standing advertising screens sequentially, changing screens every ten seconds, until the terminal is activated via activator card reader A. Upon receipt of a card reader interrupt (step 110), control of microcomputer 22 is transferred to command sub-sequence 112 (BPSTSK (FIG. 5.)) which causes microcomputer 22 to search memory 58, 60 to locate the coupon transaction history, if any, corresponding to the customer credit account number presently provided via card reader 36. If no corresponding history is located, command step 114 causes microcomputer 22 to create a new file corresponding to the new customer account number. If, on the other hand, a previous coupon transaction history is located, this data is utilized at step 116 to mask out previously selected coupons from the display if the limit of coupons per period has already been reached under this customer's account number so that requests for coupons utilizing a single account number are limited to the prescribed number of each coupon. Control is then transferred to step 118. As the customer makes selections from the displayed coupons causing a touch screen interrupt (step 120), control of microcomputer 22 is transferred to a background coupon printing command sequence 122 (BPOTSK (FIG. 5)) which causes printer 32 to print and dispense the coupons. If no touch screen interrupt has been received at step 120, control is transferred to an interrogatory command sequence 122 to determine whether the prescribed time for making a selection has elapsed. If so, control is transferred to interrogatory step 124 which causes microcomputer 22 to determine whether the last page of the menu has been displayed. If the time has elapsed and the last page has been displayed, control is transferred to step 126, which causes the transaction to be recorded and return control to the ready sequence. If the last page has not been displayed, but the customer has requested to "quit" selection, (step 128 causes control to be transferred to step 126) where the transaction is recorded and control reverts to the ready sequence awaiting the next transaction.

If at step 122, the prescribed time for making a selection has not elapsed, control is transferred to interrogatory step 130 which causes microcomputer 22 to determine whether the customer has requested the "next page" of coupons. If so, control is transferred to step 132 which causes microcomputer 22 to retrieve the next page data and returns control to step 118 thereby causing the next page to be displayed. On the other hand, if at step 122, the time has not elapsed, and no "next page" request has been made at step 130, control returns to step 120 continuously until a selection is made or the time for selecting expires. When the customer has completed the transaction, and the coupon is dispensed, the transaction is recorded in coupon history addressed by the account number and control is transferred (step 132) back to the beginning of the ready mode where the sequence is repeated, i.e., advertising is displayed until the next customer activates the terminal and initiates the selection/dispensing sequence. While not explicitly illustrated in FIG. 7, it should be noted that the ready mode may be exited at any time response to command from the host computer H to go to the hide and watch mode, or to the start up mode or as a result of a terminal power failure or local restart.

Figure 6:
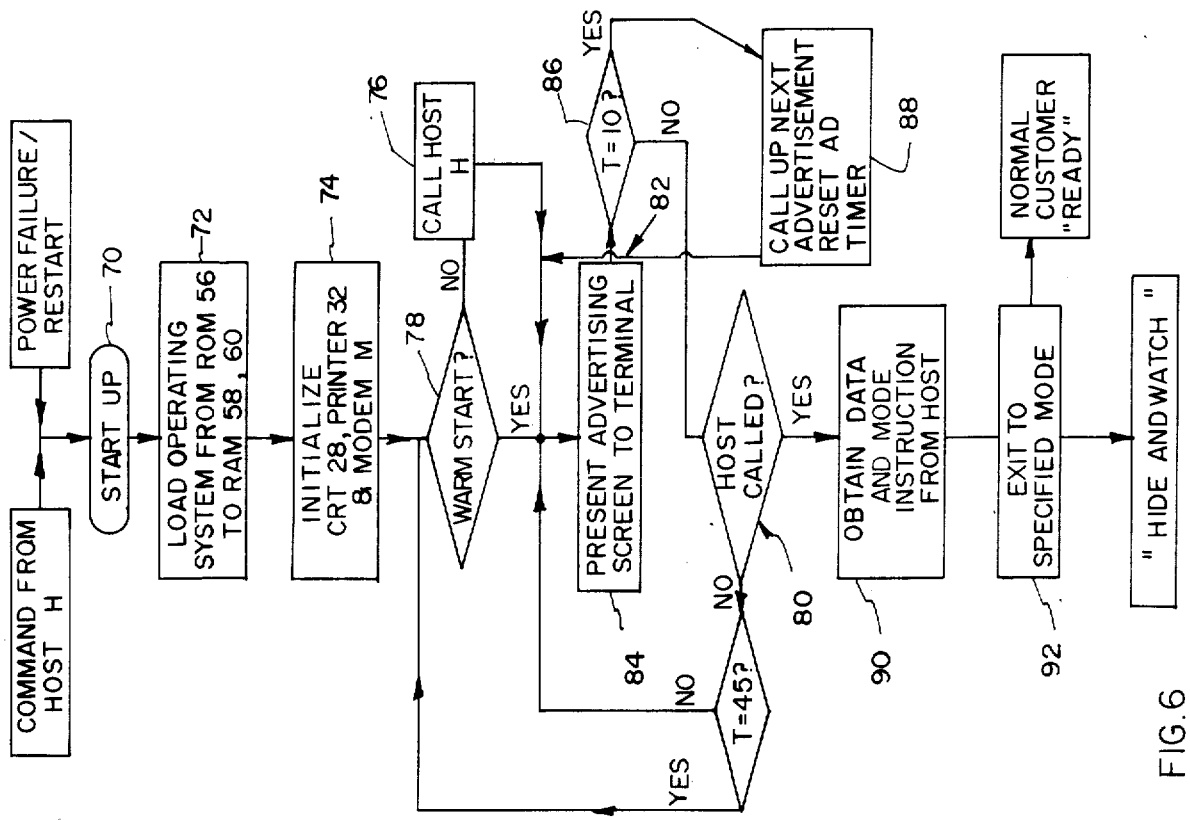
Figures 8, 9:
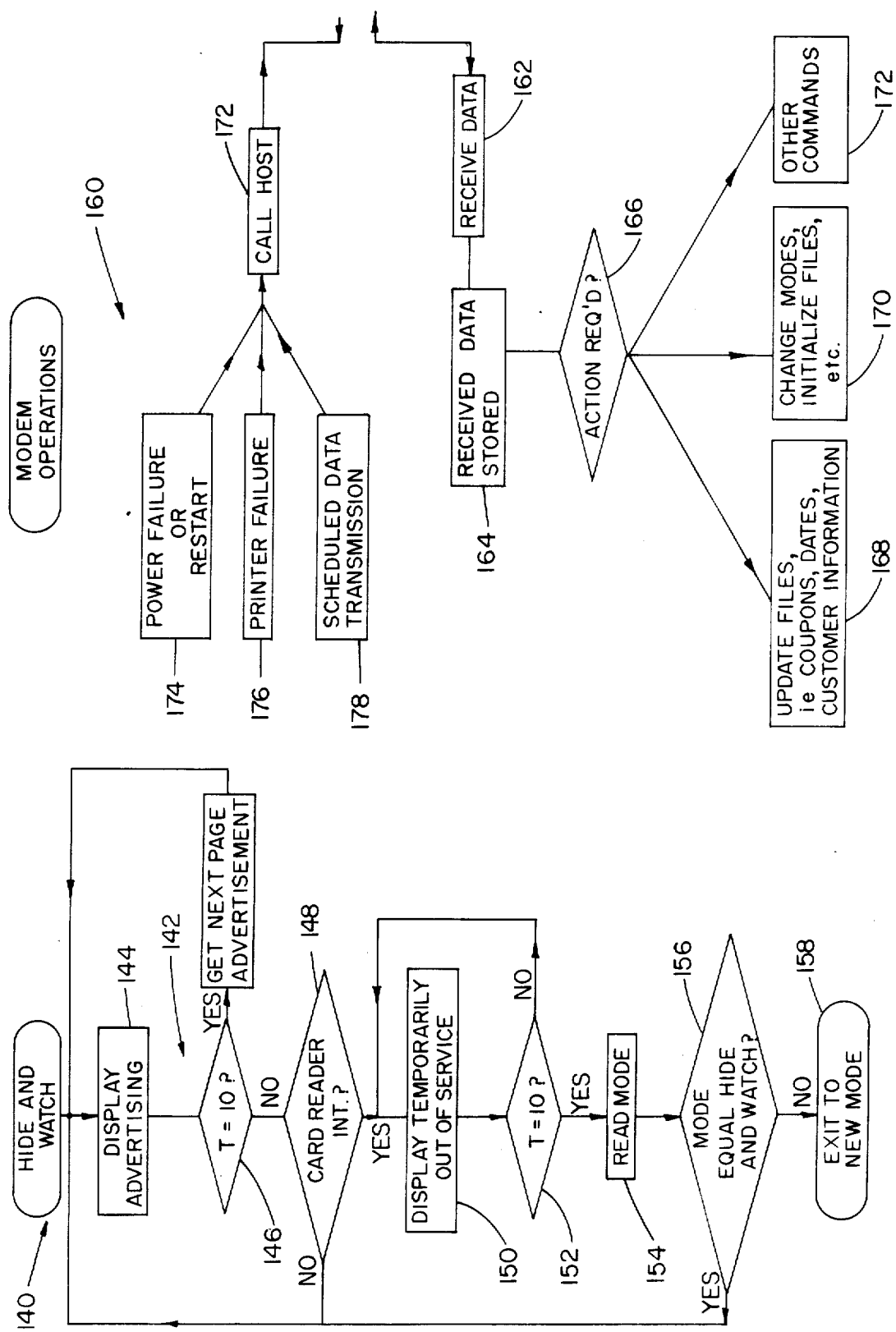

The host computer will be programmed with over-all limits for the entire terminal so that upon such terminal reporting to the host the attainment of such limits, the host will signal command to terminal T and control of microcomputer 22 is transferred from the ready mode control sequence 100 to the hide and watch mode sequence 140 (FIG. 8). In this mode, command sequence 142 causes microcomputer 22 to display the initial page of free-standing advertising (step 144) until a prescribed time, i.e., ten seconds, has elapsed. At the expiration of the prescribed time, step 146 causes control to be transferred to step 148 to retrieve the next page of advertising and return control to display step 148. This cycle is repeated unless a card reader interrupt is received (step 148) indicating a customer attempt to activate the terminal T. If an interrupt is received, step 148 transfers control to step 150 which causes a "temporarily out of service" message to be displayed to the customer on cathode ray tube 28. This message is maintained for a fixed period, i.e., ten seconds, via step 152, after which control is transferred to step 154 to receive mode instructions from host computer H. If the mode has not changed, control is returned (step 156) to the beginning of the hide and watch sequence to continue displaying advertisments until another card reader interrupt is detected. If, however, an updated mode instruction has been received from host computer H via modem M, control is transferred at step 158 to the indicated mode sequence, which will either be the ready mode (FIG. 7) or the start up mode (FIG. 6).

Thus, Hide and Watch sequence 140 may be utilized by host computer H to temporarily disable an individual terminal T to prevent it from issuing coupons, either because of a detected malfunction or because the prescribed coupon limit for the terminal T has been attained.

Referring now to FIG. 9, the terminal modem operations 160 are illustrated in schematic flow chart form. In the preferred embodiment, the input (received data) interrupt of modem M (step 162) is always enabled to receive data from host computer H. Received data is automatically stored by microcomputer 22 at step 164 by the microcomputer interrupt handler. Valid input data will automatically cause control of microcomputer 22 to be transferred (step 166) to the appropriate command sequences such as 168, 170 or 172 to take any action required such as updating customer-oriented data (step 168), change mode of operation (step 170) or take other specified action (step 170) concurrently with on-going terminal operation and modem output, if any.

Microcomputer 22 will cause terminal T to initiate a call to the host computer H (step 172) under any one of three conditions:

(a) On power failure or restart, a call to a host trouble number to obtain date/time of day data is initiated (step 174);

(b) On printer failure or other detectable failure, a call to a host trouble number to report an out of service condition (step 176); or, (c) At regularly scheduled intervals, or when a predesignated number of terminal transactions are recorded, to transfer coupon history and coupon counts to the host's data number (step 178).

These modem operations take place automatically and concurrently with terminal operations.

B. Detailed Description of Command Sub-Sequences

In order for microcomputer 22 to operate terminal T to achieve the desired terminal control and monitoring functions illustrated in the general flow charts of FIGS. 5–9, control of microcomputer 22 is, as appropriate, transferred to one or more of the sub-sequences listed in FIG. 5 and shown in detail in FIGS. 10–28.

1. The Executive Sequence

Figure 18:
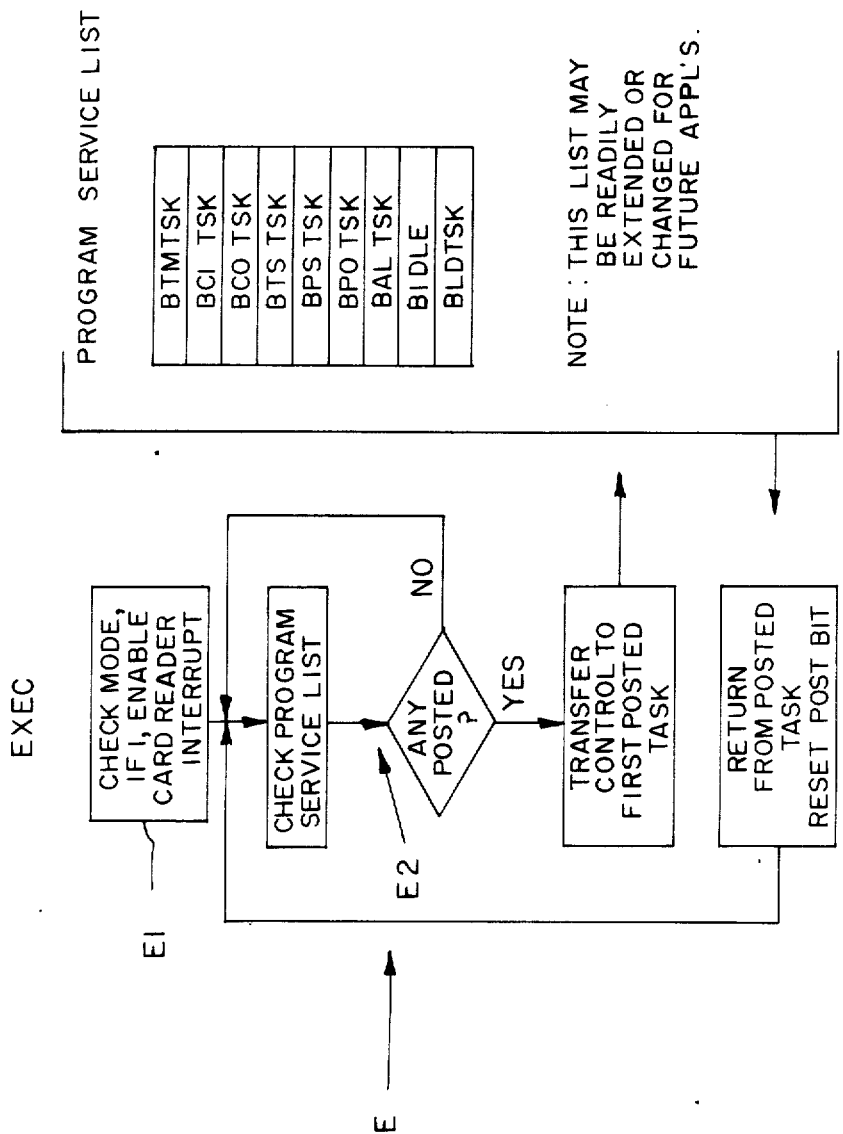

According to the operating system used in the present invention, control of microcomputer 22 generally resides in the executive command sequence E illustrated in FIG. 18. Control is automatically transferred to this executive sequence E upon completion of the power up sequence P illustrated in FIG. 19.

Sequence P is an initialization sequence which is entered when terminal T is energized. Control is transferred to step P1 which causes microcomputer 22 to transfer or boot the operating system from non-volatile memory 56 to memories 58, 60. Step P2 then transfers control of microcomputer to the operating system, and step P3 causes the microcomputer 22 and the associated peripherals (FIG. 4) to be initialized to begin the operating sequence. Control is then transferred to step P4 which causes a background task flag (BIDLE) to be set or posted and transfers control of microcomputer 22 to the executive sequence E (FIG. 18).

The executive sequence E runs at all times that there is no active interrupt as from one of the foreground sequences listed in FIG. 5 and described hereinafter. The executive sequence may be requested to execute any of the background service sequences shown in the program list (FIG. 18) by any other sequence which causes the particular background task flag to be posted or set. The selected background task sequence will then be executed to completion except for servicing interrupt (foreground) requests. As described above, the executive sequence is entered upon power up, with the BIDLE background task flag posted (step P4). The BIDLE task is a background idling task which is executed in the absence of other requests.

Turning now to FIG. 18, executive sequence E is entered at step E1 which causes microcomputer 22 to read the operational mode variable (initialized at step P3 to 1, and subject to control by host H) and to enable card reader 36 (FIG. 4) so that customers may activate terminal T to begin dispensing coupons.

Control is then transferred to step sequence E2 which causes microcomputer 22 to repeatedly determine whether any background task sequence flags have been posted, and to transfer control to the first posted background task. The background task sequences will be described in detail below, but each will return control of microcomputer 22 back to the executive sequence E upon completion. We now turn to a description of the priority, foreground interrupt sequences to which control is transferred upon demand.

2. The Foreground Sub-sequences

The foreground command sub-sequences illustrated generally in FIG. 5 are real-time, interrupt activated and, by definition, asynchronous. Since these sub-sequences interrupt other sequences, and may themselves by interrupted, any registers used by a sub-sequence must be saved on entry and restored on exit. Each of the various components of terminal T may be allowed to interrupt microcomputer 22 if enabled (see FIG. 5).

a. Card Reader Interrupt

Figure 10:
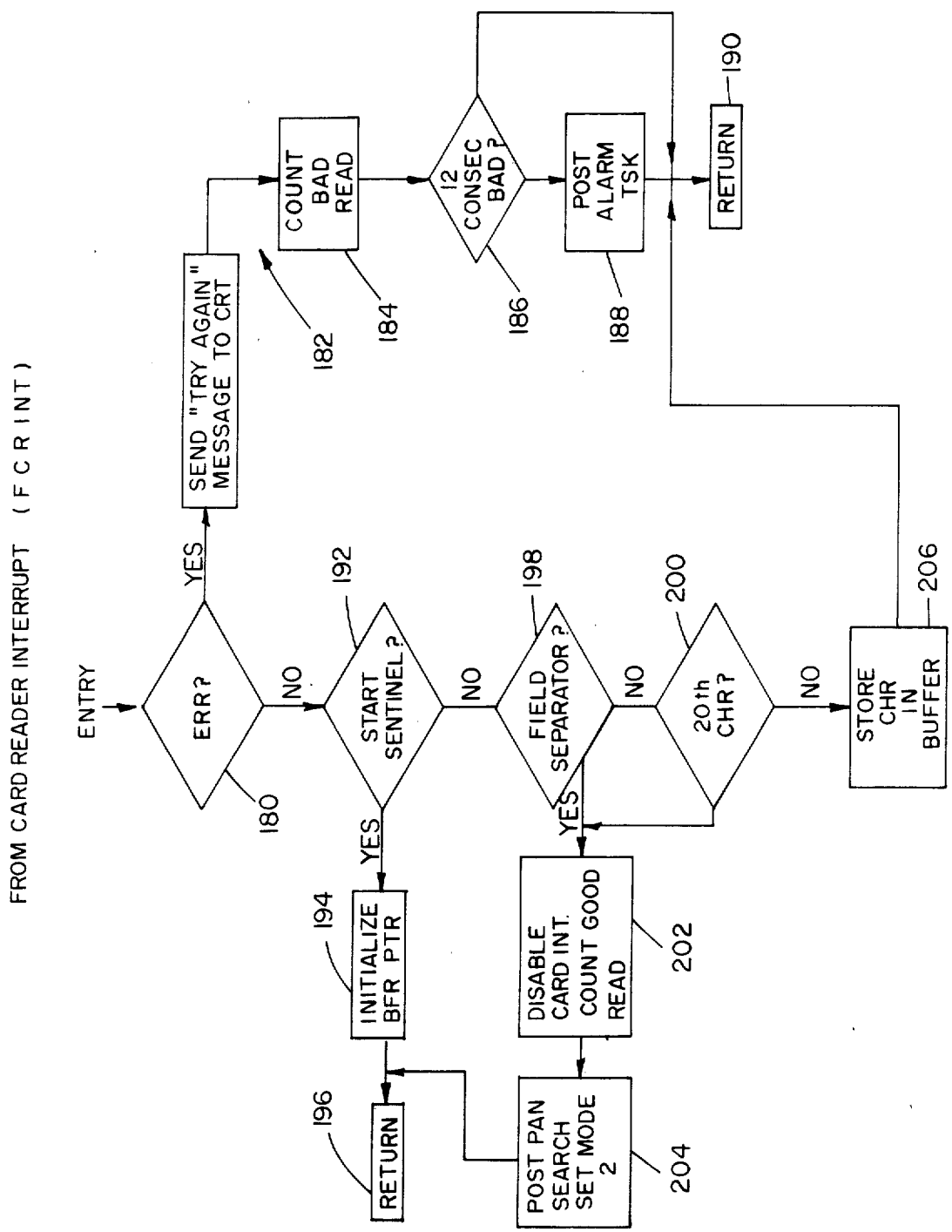

The card read interrupt (FCRINT) sub-sequence is illustrated in FIG. 10. Control of microcomputer 22 is automatically transferred to this sub-sequence each time an interrupt from card reader 36 is received. At entry, step 180 causes microcomputer 22 to read the interrupt character to determine whether an error condition exists such as will be the case when a customer has improperly used activator A or attempted activation by improper means, or when activator A has malfunctioned.

If an error is detected, control is transferred to step sequence 182 which causes microcomputer 22 to send a "try again" message to the cathode ray tube 28 to prompt the customer to attempt another activation. Sequence 182 also includes steps 184, 186 and 188 which cause microcomputer 22 to post an alarm bit or flag upon the twelfth consecutive card reading error before returning (step 190) control to the last executed step prior to the interrupt.

Typically, no error character will be detected at step 180 and control will be transferred to step 192 which causes microcomputer 22 to determine whether the character from card reader is a start sentinel signaling the beginning of the transmission of customer primary account number data. The term primary account number is used herein to designate the number or code encoded upon the customer's credit card to identify the customer. If the character from the reader is a start sentinel, control is transferred to step 194 which initializes a pointer in the buffer register where the complete account information will be temporarily stored and returns (step 196) control to the point of departure prior to the interrupt. Since the card interrupt has not been disabled, the card reader interrupt will cause the next character, i.e., the first character of the account number to be read and so on until a field separator (step 198) or the twentieth character (step 200) is read, either of which marks the end of an account number, whereupon control is transferred to step 202 to disable the card reader interrupt. Thereafter, control is transferred to step 204 which causes a primary account number search flag to be posted which will in the manner described herein ultimately cause microcomputer 22 to begin searching previously entered account numbers to determine whether the present account number has been recently utilized. Step 204 also sets the terminal mode flag to indicate an account number search is in progress, then returns (step 196) control to the point of departure prior to the interrupt. In this manner, as each character prior to the field separator or the twentieth character is read, control is transferred from step 200 to step 206 which causes microprocessor 22 to store the character in the buffer initialized at step 194 until the entire account number is read and stored.

b. Interrupt from the Output to the Cathode Ray Tube (FSINT) (FIG. 11)

Figures 11, 12:
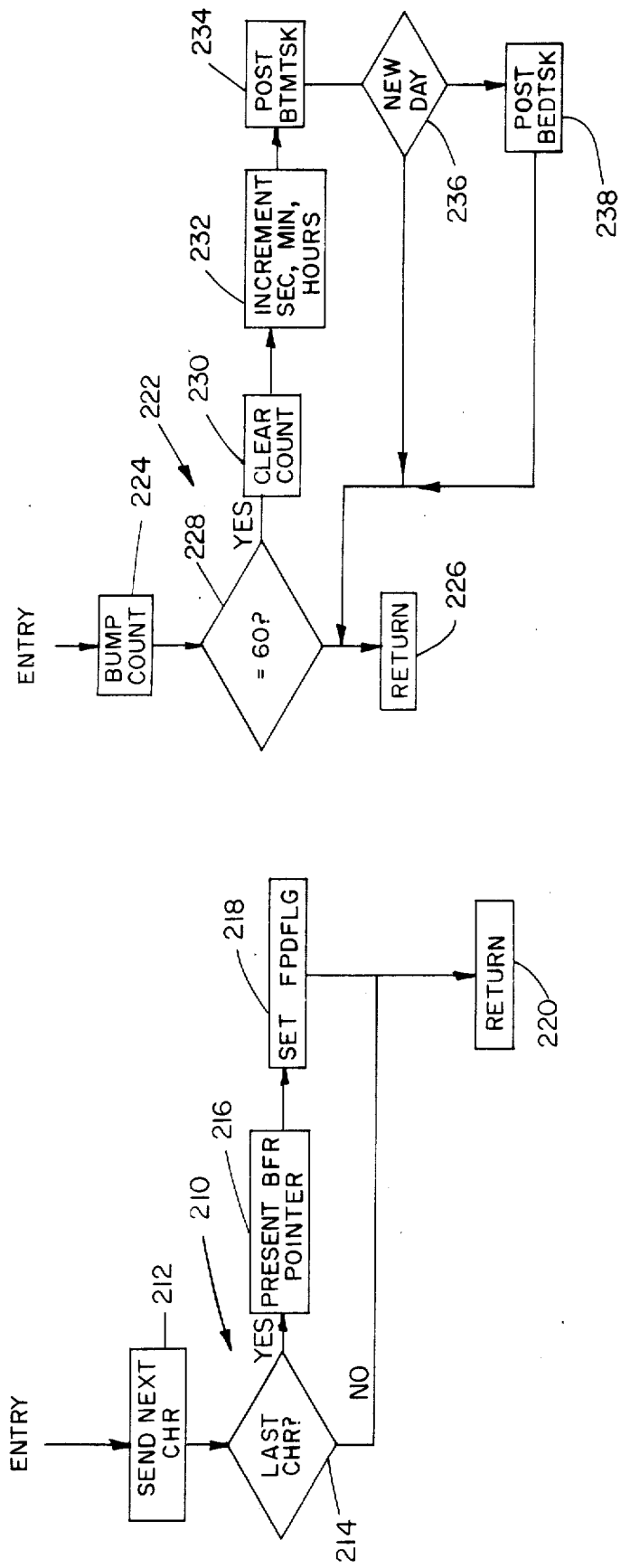

Referring now to FIG. 11, on each occasion when an output is provided by microcomputer 22 to UART 50 for transmitting to cathode ray tube 28, such as to display coupons, advertising or messages, control of microcomputer 22 will be transferred to sub-sequence 210. Step 212 of this sub-sequence causes UART 50 to send the next character of output data each time the sequence is entered until the last character is sent. When the last character has been sent, step 214 transfers control of microcomputer 22 to steps 216 and 218 which cause the output buffer pointer to be reset and signal that the output has been completed by setting the FPDFLG flag. Control is then returned (step 220) to the point of departure prior to the interrupt.

c. Interrupt from Clock (FCLINT) (FIG. 12)

The clock interrupt sub-sequence 222 shown in FIG. 12 is provided to enable microcomputer 22 to maintain time of day and date and to monitor elapsed time from the occurrence of various events as set forth in the drawings. This sub-sequence is entered in response to an internally generated 60 HZ clock interrupt. Sub-sequence 222 causes microcomputer 22 to increment an interrupt count (step 224) upon each entry and return (step 226) to the point of departure until sixty (60) entries have been made, i.e., one second has elapsed, whereupon control is transferred from step 228 to step 230. Step 230 causes the clock count register to be cleared and transfers control to step 232 where the seconds, minutes and hours registers of the microcomputer's internal clock are incremented as is appropriate. Control is then transferred to step 234 where the BTMTSK flag is posted to indicate that elapsed time has been incremented so that control of microcomputer 22 may be transferred to that background sub-sequence when appropriate to test for the expiration of any prescribed time limits. Where the time increment made at step 232 was the last of a fully day, step 236 transfers control to step 238 to post an end of day (BEDTSK) flag prior to returning (step 226) control to the point of departure prior to interrupt. The end of day (BEDTSK) flag will cause control of microcomputer 22 to be transferred to that background sub-sequence (FIG. 28) to cause microcomputer 22 to perform specified end of day housekeeping chores.

d. Touch Screen Interrupt (FTSINT) (FIG. 13)

Figure 13:
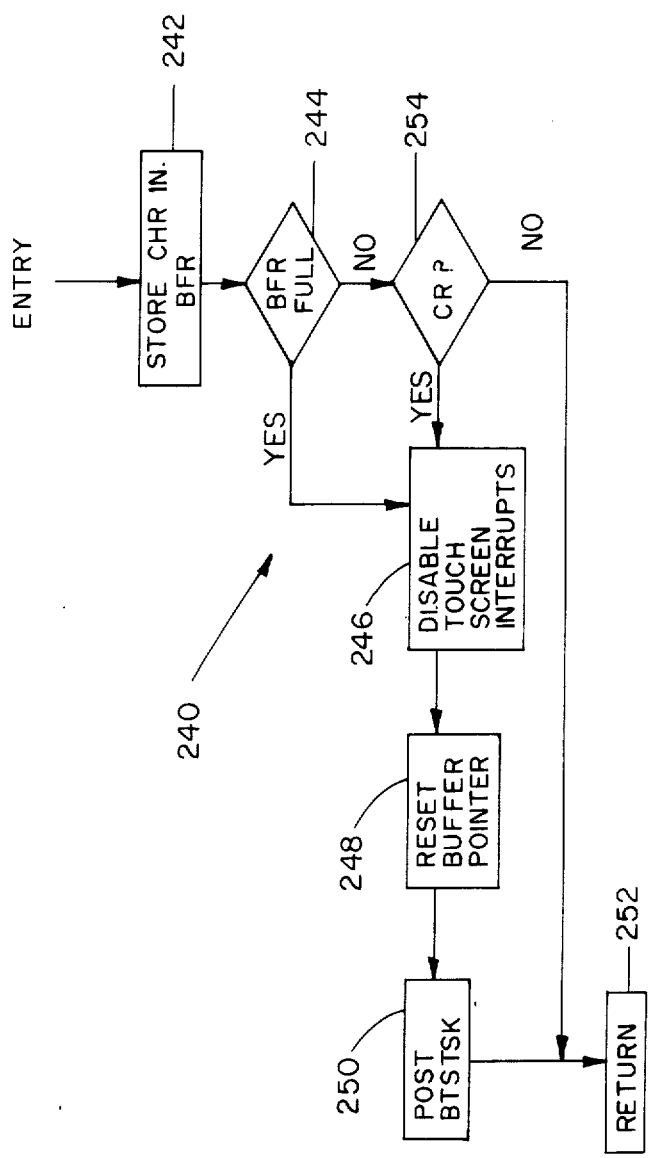

Once the touch screen 30 has been enabled, which in the normal course of events occurs after the terminal has been correctly activated by a customer and the first page of the menu of available coupons is displayed, any selection or other input from touch screen 30 will cause an appropriate interrupt to be generated and control of microcomputer 22 will be transferred to the interrupt sub-sequence 240 FTSINT illustrated in FIG. 13.

Sub-sequence 240 FTSINT is entered at step 242 which causes microcomputer 22 to store the data character transmitted via UART 50 (FIG. 4) in the touch screen buffer register then transfers control to step 244. Step 244 causes microcomputer 22 to test the touch screen buffer to determine if it is full, and if so forces internal processing by transferring control to steps 246, 248 and 250 in sequence. These steps cause microcomputer 22 to disable the touch screen interrupts (246) reset the touch screen buffer pointer (248) and set the touch screen background task flag (BTSTSK), respectively, then return (252) control of microcomputer 22 to the point of departure prior to interrupt. Setting the BTSTSK flag and disabling the touch screen interrupts causes microcomputer 22 to take up background touch screen task sequence in the manner described hereinafter to process the customer requests. If at step 244 control is transferred to step 254, step 254 causes microcomputer 22 to test the input character to determine if it is one requiring processing such as a "quit", "next page" or "hold" request. If so, control is transferred to steps 246 through 250 to force internal processing as described above. If the character does not require processing, control is returned to the point of departure prior to interrupt.

e. Printer Output Interrupt (FPOINT) (FIG. 14)

Figure 14:
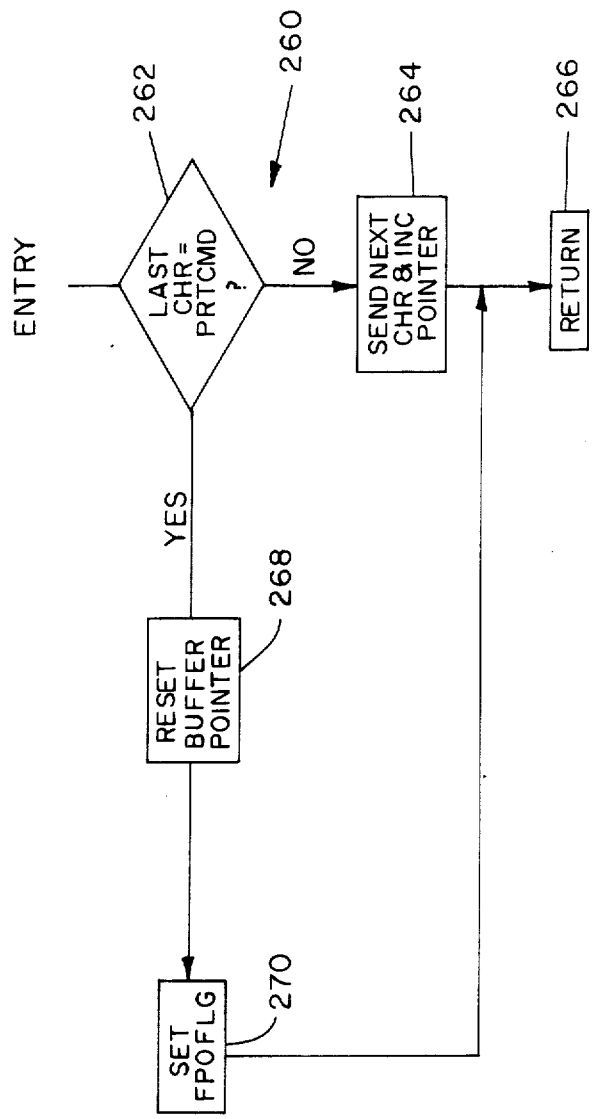

Whenever data is provided by microcomputer 22 to UART 46 for transmission to printer 32, such as when selected coupons are to be printed and dispensed to a customer, a printer output interrupt will be provided which will cause control of microcomputer 22 to be transferred to the sub-sequence 260 (FPOINT) illustrated in FIG. 14. This sub-sequence simply causes each character to be sent to printer 32 until a print command (which causes printer 32 to begin printing the coupon) is transmitted. Until a print command is transmitted, control will be transferred from step 262 to step 264 thereby causing the next character to be transmitted and the printer output register pointer to be incremented prior to returning (step 266) control to the point of departure prior to interrupt. If, on the other hand, a print command was the last character sent, control is transferred from step 262 to steps 268 and 270 in sequence which reset the printer output buffer pointers (268) and set a task complete (FPOFLG) flag prior to returning (266) control to the point of departure prior to the last interrupt.

f. Printer Input Interrupt (FPIINT) FIG. 15)

Figure 15:
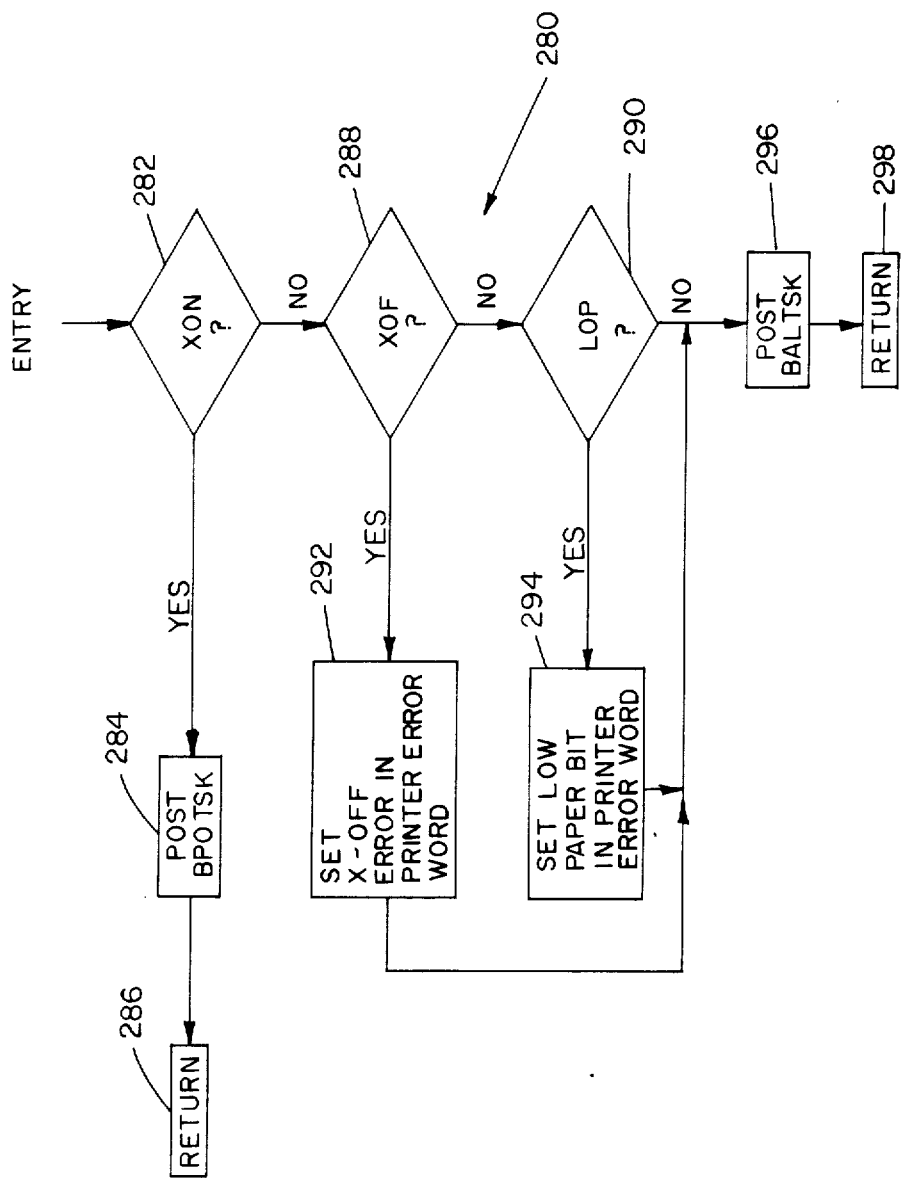

Printer input interrupts occur when a printing transaction has been completed or a print error is signaled such as for low paper, or a time out error, i.e., where the coupon has not been printed within a prescribed maximum time limit, has occurred. Each time a printer input interrupt is provided to microcomputer 22, control of microcomputer 22 is transferred to background sub-sequence 280 (FPIINT) (FIG. 15).

Sequence FPIINT is entered at step 282 which causes microcomputer 22 to read the input character (from UART 46, FIG. 4) to determine if the printing task has been completed. In the usual case the input character will equal a prescribed value, i.e., "XON", indicating the transaction was completed routinely and control of microcomputer 22 is transferred to step 284. Step 284 causes a microcomputer 22 to set the printing task complete flag and then returns (286) control to the point of departure prior to the last interrupt. If, on the other hand, the input character is not equal to "XON", an error or alarm condition is indicated and control is transferred to step 288.

Step 288 and 290 cause microcomputer 22 to test the printer input character to determine if a time out error (XOF at 288), i.e., the printing was not completed within the specified time, or a low paper (LOP at 290) signal is being provided. In either case, control is transferred to the error recording steps 292, and 294 respectively which cause microcomputer 22 to set an error flag indicative of the type of error which has been reported. Control of microcomputer 22 is then transferred to step 296 which causes microcomputer 22 to post a background alarm task flag (BALTSK) and then return (298) control to the point of departure prior to the interrupt. Setting or posting the background alarm task flag will cause microcomputer 22 to take up an appropriate background task to deal with the reported printer error.

g. Modem Output Interrupt (FCOINT) (FIG. 16)

Figure 16:
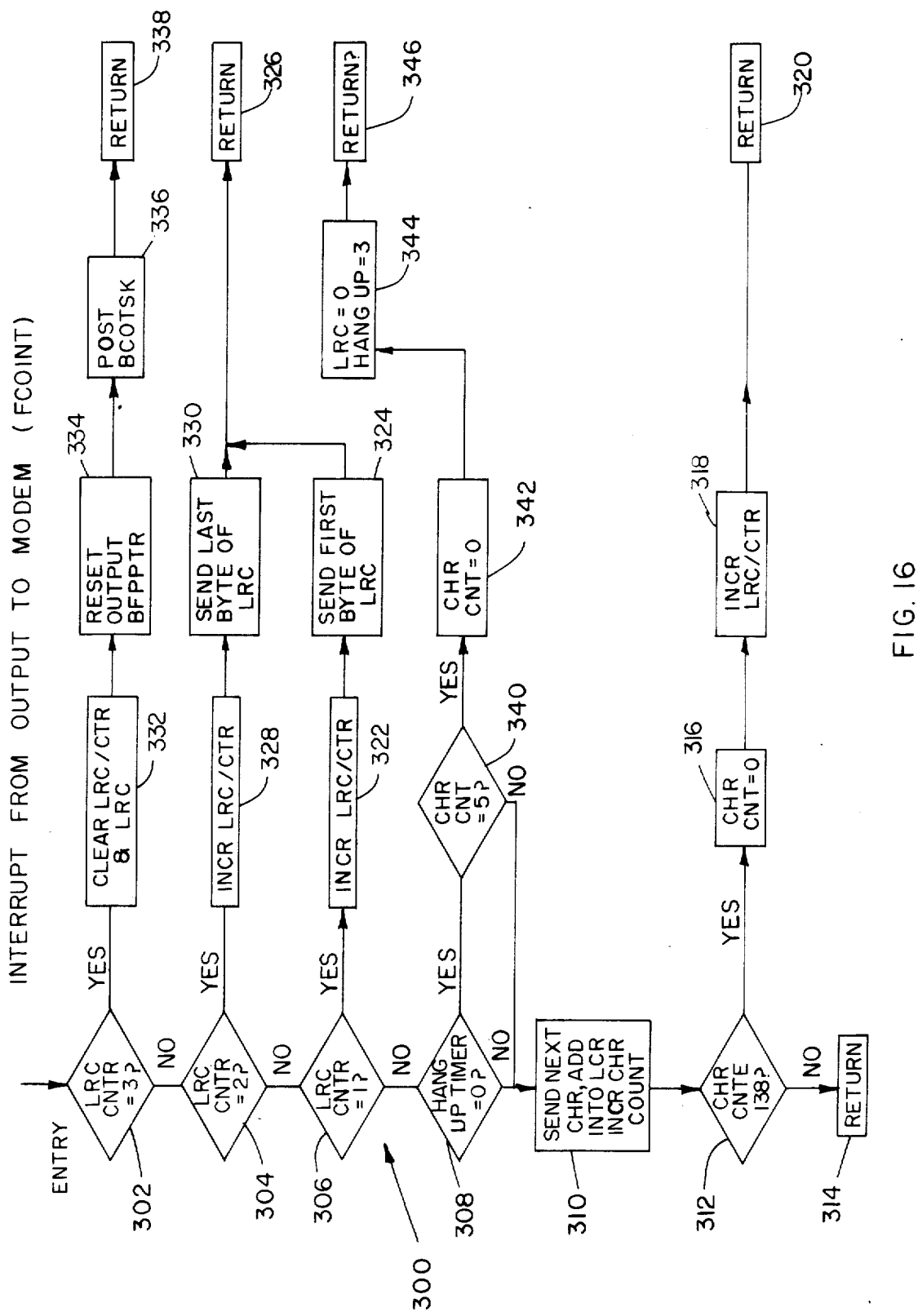

Each time microcomputer 22 provides a section of data for transmission from terminal T to host H via UART 50 and modem M, a modem output interrupt is provided by UART 50 which causes control of microcomputer 22 to be transferred to the foreground sub-sequence 300 (FCOINT) illustrated in FIG. 16. In the preferred embodiment, communications between the host H and terminal T are full duplex in blocks of 140 bytes, with ten (10) leading bytes of overhead, one hundred twenty-eight (128) bytes of data, and two (2) trailing bytes of a transmission error check. The error check variable is designated in the drawings as variable LRC. The LRC bytes represent the sum of the previous one hundred thirty-eight (138) bytes. The LRC counter will be initialized at zero when control is transferred to sub-sequence 300.

Referring now to FIG. 16, control is in the first instance transferred through steps 302, 304, 306 to step 308 since the transmission error check variable LRC is initially zero. Control will likewise be transferred through step 308 to step 310 since the hang up timer will typically not have expired. The hang up timer sequence beginning with step 308 is described more fully below.

Step sequence 310 causes the terminal T to send the next character to the host H, add the value of the character to the transmission error check variable LRC and increment the character count. Control of microcomputer 22 is then transferred to step 312 which tests the character count to determine if the complete block of data (ten (10) leading, plus one hundred twenty-eight (128) characters) has been sent, and if not returns (314) control to the point of departure so that the above described sequence will be iterated to complete the transmission. If the complete block has been transmitted, the character count will equal one hundred thirty-eight (138), and control will be transferred from step 312 to step 316 which causes microcomputer 22 to reset the character count to zero in preparation for the next transmission and transfer control to step 318.

Step 318 causes microcomputer 22 to increment the LRC counter, i.e., from zero to one in the first instance, and then returns (320) control to the point of departure prior to interrupt. In this fashion, control of microcomputer 22 will again be transferred to sub-sequence 300 to step 302 so the LRC variable can be transmitted to complete the data transmission.

On re-entry, control will be transferred through steps 302 and 304 to step 306. Step 306 control of microcomputer 22 is transferred to step 322 which causes microcomputer 22 to increment the LRC counter, i.e., from 1 to 2, and transfers control to step 324. Step 324 causes the first byte of the LRC variable to be transmitted and then returns (326) control of microcomputer 22 to the point of departure prior to interrupt, whereupon sub-sequence 300 will normally be re-entered at step 302.

On the third entry at step 302, control will pass from step 302 to step 304 (LRC now equals (2) and to step 328. Step 328 causes microcomputer 22 to increment the LRC counter, i.e., from 2 to 3, and transfers control to step 330 to cause the second and last byte of the LRC variable to be transmitted to the host H and then returns (326) to the point of departure prior to interrupt. When control is transferred to step 302 for the fourth time in this sequence, LRC will equal 3, and control will be transferred from step 302 to steps 332, 334 and 336 sequentially to clear the LRC counter and the LRC variable (332), reset the modem output buffer pointer (334), and post or set a background task flag (335) in preparation for the next transmission and to signify completion of the present block. Control is then returned (338) to the point of departure prior to interrupt where, if transmission is completed, control of microcomputer 22 will be transferred to another posted background or interrupt task.

Sub-sequence 330 includes a "hang up" test sequence including steps 308, 340, 342, 344 and 346 which causes microcomputer 22 to send a "hang up" message to modem M to cause modem M to disconnect from host H. Upon initialization of an output communication to host H via modem M, microcomputer 22 causes a three second timer to be set to allow host H to respond, if necessary, to the data transmission from terminal T. If this timer has expired, indicating no return message has been received, step 308 causes control of microcomputer 22 to be transferred to steps 340-344. Step 340 causes microcomputer 22 to send a five character "hang up" command to modem M by iterating and testing the character count at step 340, and upon completion, transfer control to steps 342-346. Steps 342-346 cause microcomputer 22 to reset the character count (step 342), reset LRC variable and the three second hang up timer (step 344) and return (step 346) control to the executive sequence.

h. Modem Input Interrup (FCIINT) (FIG. 17)

Figure 17:
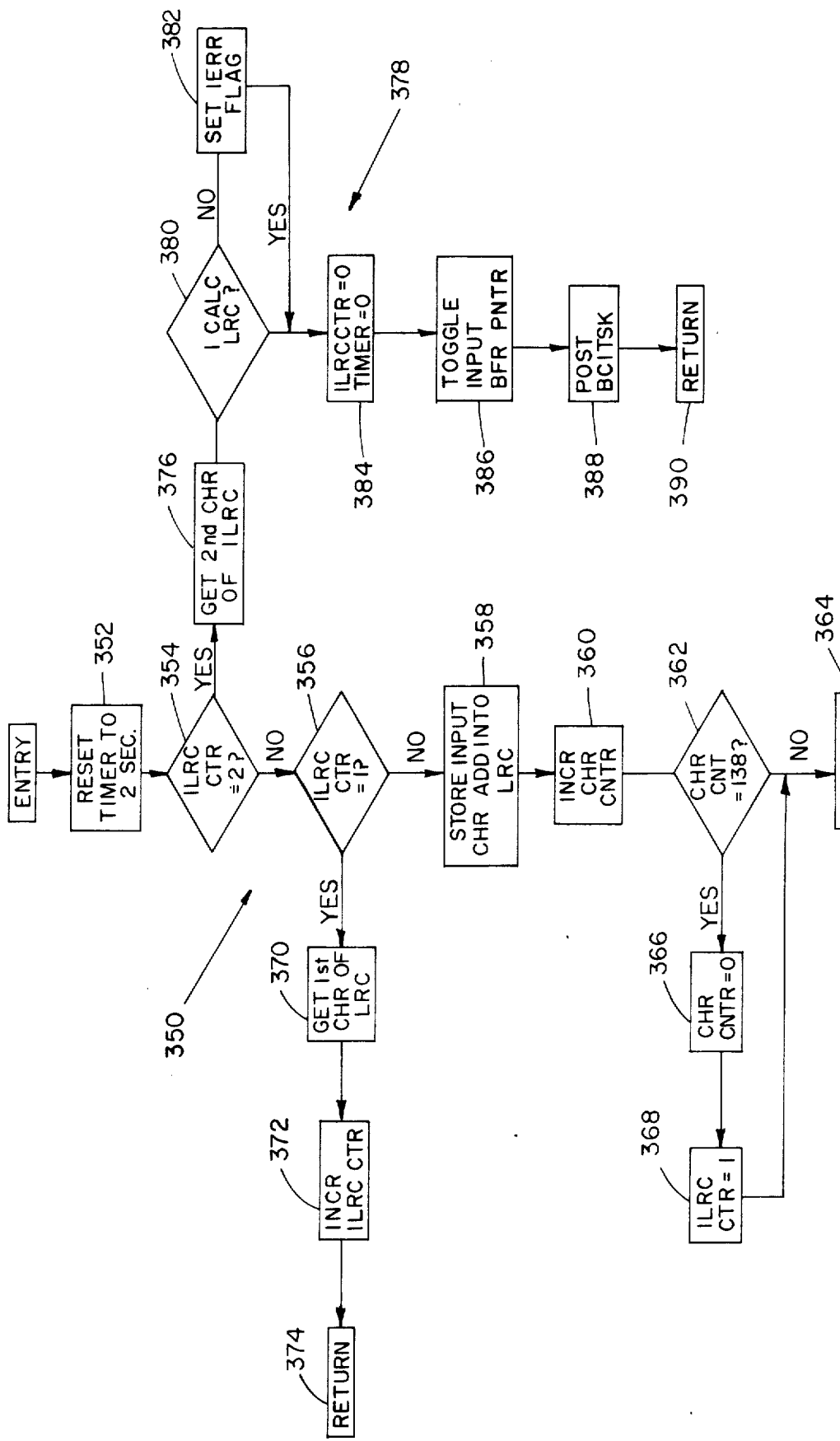

Referring now to FIG. 17, control of microcomputer 22 is transferred to the modem input interrupt sub-sequence 350 (FCIINT) in response to an interrupt from UART 54 indicating receipt of input data from host H. In this sub-sequence, control of microcomputer 22 is initially transferred to step 352 which causes a transaction timer to be set equal to two seconds then transfers control to step 354. Upon initial entry in this sub-sequence, reception error check variable ILRC and the character counter are equal to zero. As in the modem output interrupt sequence, in this sequence data is received in one hundred thirty-eight (138) character groups followed by the 2 byte ILRC.

Thus, upon initital entry control of microcomputer 22 is transferred from step 352 through steps 354 and 356 to step 358 which causes microcomputer 22 to store the incoming characters in sequence and add the character value to reception error detection variable LRC. Control of microcomputer 22 is then transferred to step 360. Step 360 causes microcomputer 22 to increment the incoming character counter and transfers control to step 362 which will return (364) control to the point of departure prior to interrupt the block of one hundred thirty-eight (138) characters have been received. When the entire block has been received control will be transferred from step 362 to steps 366 and 368 in sequence which cause microcomputer 22 to reset the character counter (366) and increment the ILRC counter (368) to prepare for the next data reception and cause the ILRC error detection counter to be received. From step 368 control is returned (364) to the point of departure prior to interrupt.

Upon re-entry to this interrupt sub-sequence control is transferred through steps 352 and 354 to step 356, whereupon ILRC being equal to one, control is transferred to step 370. Steps 370 and 372 sequentially cause microcomputer 22 to get the first character of the ILRC counter (372) before returning (374) control to the point of interrupt. Upon re-entry, control is transferred through step 352 to step 354 whereupon, ILRC being equal to two, control is transferred to step 376 which causes microcomputer 22 to get the second character of the ILRC variable then transfers control to the error detection sequence 378.

Sequence 378 begins with interrogatory step 380 which causes microcomputer 22 to compare the received ILRC to the computer ILRC (step 358) to determine if they are equal. If not, control is transferred to step 382 which causes an input error flag to be set so that microcomputer 22 will be prompted to the appropriate action. If no error is detected, control is transferred from step 380 to steps 384, 386 and 388 sequentially which cause microcomputer 22 to reset the ILRC counter and timer to zero (384), reset the input buffer register pointer (386), and post or set background sequence task flag (BCITSK) (388) before returning (390) control to the point of departure prior to interrupt.

3. The Background Task Sub-sequence

The sub-sequences described in this section are all entered from the executive command sequence E (FIG. 19) as a result of having been requested during some other functional sequence. The request is made by setting or posting the appropriate task flag. The subscript TSK for "task" is used in designating the various background sub-sequences except for BIDLE sub-sequence which is the background idle loop. The tasks that each sub-sequence performs are generally as follows:

(a) BIDLE causes the microcomputer 22 to provide free-standing advertising video to cathode ray tube 28 and to rotate ads every ten seconds;

(b) BPSTSK causes the microcomputer to put existing or new coupon history files in buffer BPSBFR (FIG. 13, step 242);

(c) BTSTSK interprets inputs from touch screen 30, (FIG. 13, step 250), updates coupon history and count files, or the touch screen error file, queues coupon print requests, gets the next coupon screen when required, sets mode flag to 1 and updates non-volatile memory 56 when the task is completed;

(d) BTMTSK is automatically entered each second from foreground clock interrupt sequence FCLINT (FIG. 12) to service any expired timer;

(e) BPOTSK causes microcomputer 22 to get the next entry from the printer queue and initiates transfer to the printer (FIG. 15, step 284);

(f) BALTSK is executed in the event of printer error conditions to terminate the current printing transaction in an orderly fashion, sets operation mode to five to indicate printer failure, and posts the BCOTSK flag to cause microcomputer 22 to call the host H to report the failure; BALTSK also initiates a call to host H in the event of repeated card reader errors (FIG. 10, step 188) but without setting the operational mode to five;

(g) BCOTSK causes the terminal T to initiate a call to host H, and, if a connection is already established, initiate transfer of the next data block (FIG. 16, step 336);

(h) BCITSK causes microcomputer 22 to check incoming data from host H and initiates corrective action if necessary; if the input data is acceptable, BCITSK causes microcomputer 22 to perform the indicated action from host H, and also controls the data input timer and recognizes and discards the disconnect data sequence at the end of host communications.

A detailed description of the background task subsequences with reference to corresponding flow chart diagram follows.

a. Background Idle Loop Sequence (BIDLE) (FIG. 20)

This sub-sequence is posted upon execution of terminal power up (FIG. 19, step P4) by sequence BTSTSK entering the normal, ready condition, designated mode 1 (FIG. 22a, step 522), by sequence BCITSK entering the Hide and Watch mode designated mode 5 (FIG. 27a, steps 740, 750), by BTMTSK (FIG. 23, step 576) and reposted by BIDLE. This sequence causes terminal T to display successive free-standing ads on ten second boundaries.

Figure 20:
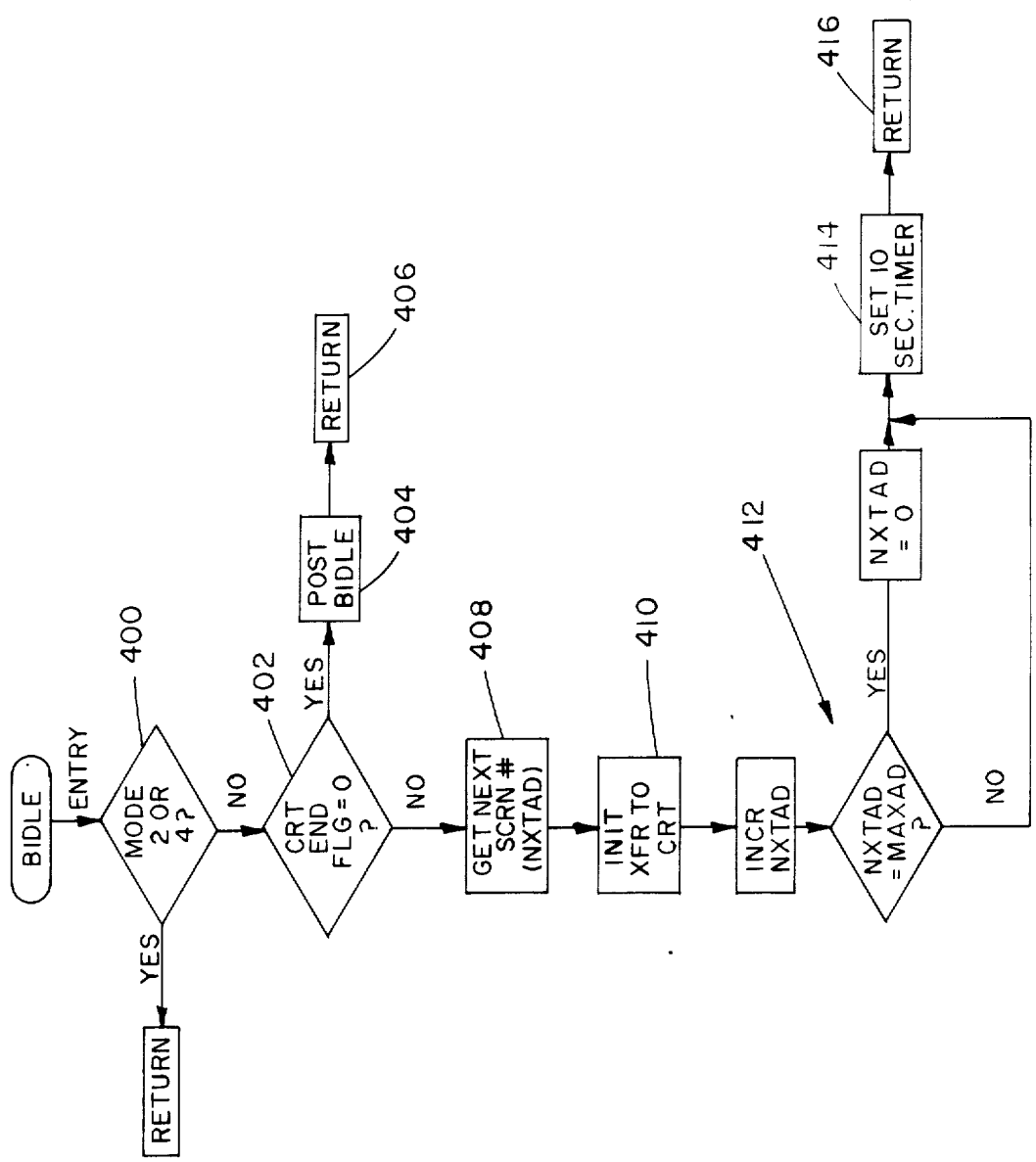

Referring now to FIG. 20, the details of subsequence BIDLE are illustrated. Upon entry, control is transferred to step 400 which causes microcomputer 22 to determine whether terminal T is in operational modes two (coupon display or transaction) or four (commanded reboot from host H) and if so returns control to executive command sequence E. If terminal T is not in operational modes two or four, control is transferred to step 402 which causes microcomputer 22 to proceed to display the next ad in sequence only if the ten second timer has elapsed which is indicated if the value of CRT end flag is equal to one. If not, control on microcomputer 22 is transferred to step 404 to repost the BIDLE task flag and return (406) control to command sequence E.

If the ten second time for displaying the current ad has expired, control of microcomputer 22 will be transferred to step 408. Step 408 causes microcomputer 22 to get the data which comprises the next ad from memory and transfer control to step 410 to initiate transmittal of this next ad to cathode ray tube 28. Control is then transferred to step sequence 412 which causes the microcomputer to increment the next ad counter until the counter attains the prescribed maximum number designated "max ad" corresponding to the number of distinct ads stored in memory. When the next ad counter reaches "max ad", step sequence 412 causes microcomputer 22 to reset the increment counter to zero to begin the display sequence anew. Thereafter control is transferred to step 414 to reset the ten second timer for the currently displayed ad and control is returned (416) to command sequence E.

b. Customer Account Number Search Task (BPSTSK) (FIG. 21)

This sub-sequence is posted in response to customer activation of terminal T with a credit card having a primary account number (PAN) encoded upon magnetic tape which has been read by card reader 36 and stored in a buffer register in random access memory 58, 60 (FIG. 10, steps 204, 206). This sub-sequence essentially searches previously used account numbers to determine if the present account number has been used to activate the terminal to dispense coupons within a prescribed time period, i.e., the last week, and if so, limits the coupons dispensed to that account number to a prescribed maximum by preventing previously selected coupons from being displayed on cathode ray tube 28 for selection. It should be understood that the prescribed maximum number of a particular coupon to be dispensed could be set equal to one, two or more, but most typically will be one. If the account number presented to microcomputer 22 via card reader 36 is new, i.e., not having been previously used within the specified period, it is stored in a random access memory 58,60 file, designated temporary PANFIL, and in nonvolatile memory 56 and a full menu of coupons is displayed for the customer.

Figure 21:
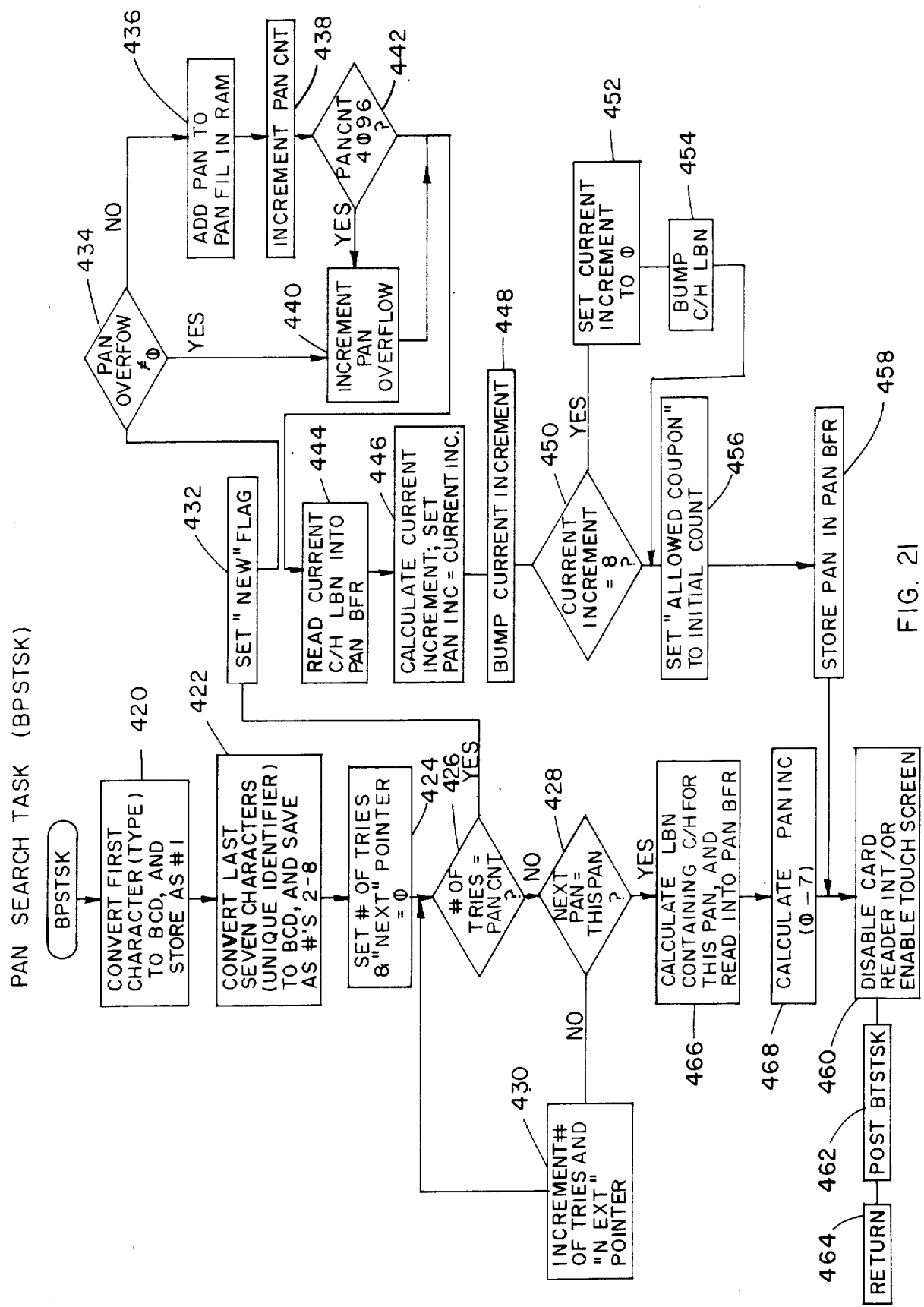

Referring now to FIG. 21, the details of sub-sequence BPSTSK are illustrated. Upon entry, steps 420 and 422 cause microcomputer 22 to convert the ASCII format accoun number read from the present customer card to binary coded digital (BCD) for the purpose of comparing it to previously used account numbers stored in memory. Control is then transferred to step 424 which causes microcomputer 22 to initialize a counter corresponding to the number of search attempts (# of tries) and the "next account" pointer to zero. Control is then transferred to step 426 to begin a sequential search of the primary account number file (PANFIL) for previously used primary account numbers.

Step 426 causes microcomputer 22 to stop searching for a matching account number when all previously used and stored account numbers have been compared, by comparing the # of tries counter to the primary account number counter (PAN CNT) which equals the total number of primary account numbers stored in memory. Typically this test will fail and control will be transferred to step 428 which causes microcomputer 22 to compare the present primary account number to the one stored at the address identified by the "next" pointer, and if unequal, transfers control to step 430 to increment the "next" pointer and "# of tries" counter and returns control to step 426. This search is repeated until all previous primary account numbers are compared (exit at step 426) or the present account number is located in memory (exit step 428).

If the principal number is new, the "# of tries" counted will eventually be incremented to equal the account counter "PAN CNT", and control of microcomputer 22 will be transferred from step 426 to step 432. Step 432 causes microcomputer 22 to set a "new" account flag and transfers control to step 434. The current account numbers are maintained in a primary account number file (PANFIL) stored in random access memory 58, 60 to facilitate searches for account numbers in a random access memory file without having to search coupon history data as well. Step 434 transfers control of microcomputer 22 to steps 436 and 438 to cause the new primary account number to be stored in this primary account number file in random access memory 58, 60 (step 436) and the primary account number counter to be incremented (step 438) if the file is not full (step 434). If, on the other hand, the primary account number file is full, control is transferred from step 434 to step 440 to increment the primary account number overflow flag. Once the primary account number counter PAN CNT is incremented to four thousand ninety-six, step 442 transfers control of microcomputer 22 to step 440 to increment the file overflow flag. When an overflow condition arises, terminal T will continue to dispense coupons in the normal manner, but the new account numbers and histories will be written over the oldest account numbers and histories in memory. Step 440 causes microcomputer 22 to increment the overflow counter in order to maintain a count of the number of overflow transactions. In any event, the count of the number of coupons dispensed is maintained in memory despite the overflow condition.

Whether an overflow condition exists or not, control of microcomputer 22 will be transferred from either step 440 or 442 to step 444 which causes microcomputer 22 to read the address (Logical Bit Number) corresponding to the data sector in memory which contains the most recently entered coupon history data into the primary account buffer. This address will be used by microcomputer 22 to retrieve the coupon history from memory to use as a mask to prevent display of previously selected coupons in subsequent transactions. Th new account number is read into the primary account buffer later, at step 458.

Control of microcomputer 22 is then transferred to step 446 which calculates the current increment of the data sector where the new account number is to be stored, and sets the value of variable PAN INC equal to the current increment. Control is then transferred to steps 450, 452 and 454 which cause microcomputer 22 to test the current increment value (step 450) and if equal to eight, reset the current increment to zero (step 452). In the illustrated embodiment, data sectors comprised of eight increments are used and therefore sub-sequence steps 450–454 cause microcomputer 22 to maintain a count of the current increment up to eight and then reset to begin counting again. Each time the count reaches eight, the sector in use has been filled and accordingly the logical bit number is incremented to correspond to the next sector to be used (step 454). Thereafter, control of microcomputer 22 is transferred to steps 456 and 458 which cause microcomputer 22 to set variable "allowed coupon" to the initial count since this is the initial use of the current primary account number and store the primary account number in the appropriate buffer (step 458). Control is then transferred to step 460 which causes microcomputer 22 to enable the touch screen interrupt so that coupon selections may be made by the customer. Control is then transferred to step 462 to post background touch screen task (BTSTSK) and returned (464) to the point of departure prior to interrupt.

Returning now to step 428, and assuming the customer's primary account number is found in the primary account number file in random access memory 58, 60, control of microcomputer 22 will be transferred from step 428 to step 466. Step 466 causes microcomputer 22 to read the coupon history corresponding to this account number ino pan buffer for use as a mask in the manner described hereafter to prevent the display of previously selected coupons. Control is thren transferred to step 468 which causes microcomputer 22 to determine the increment into the pan buffer where the present account number and coupon history are located and retain the location by setting the value of variable PAN INC. The search task then being completed, control of microcomputer 22 is then transferred to steps 460 which causes microcomputer 22 to disable the card reader interrupt and to enable the touch screen interrupt, then transfers control to step 462 which causes microcomputer to post background touch screen task flag (BTSTSK) before returning (464) control to the point of departure prior to interrupt.

This sequence BPSTSK has caused the microcomputer to record the primary account number in the primary account number buffer with "zeros" for an account history thereby allowing full coupon selection if the number was a "new" account, and recalled the coupon history into the principal account buffer to be used as a mask to prevent full selection in the case of previously used account numbers.

c. Touch Screen Task (BTSTSK) (FIGS. 22a–c)

Figure 22A:
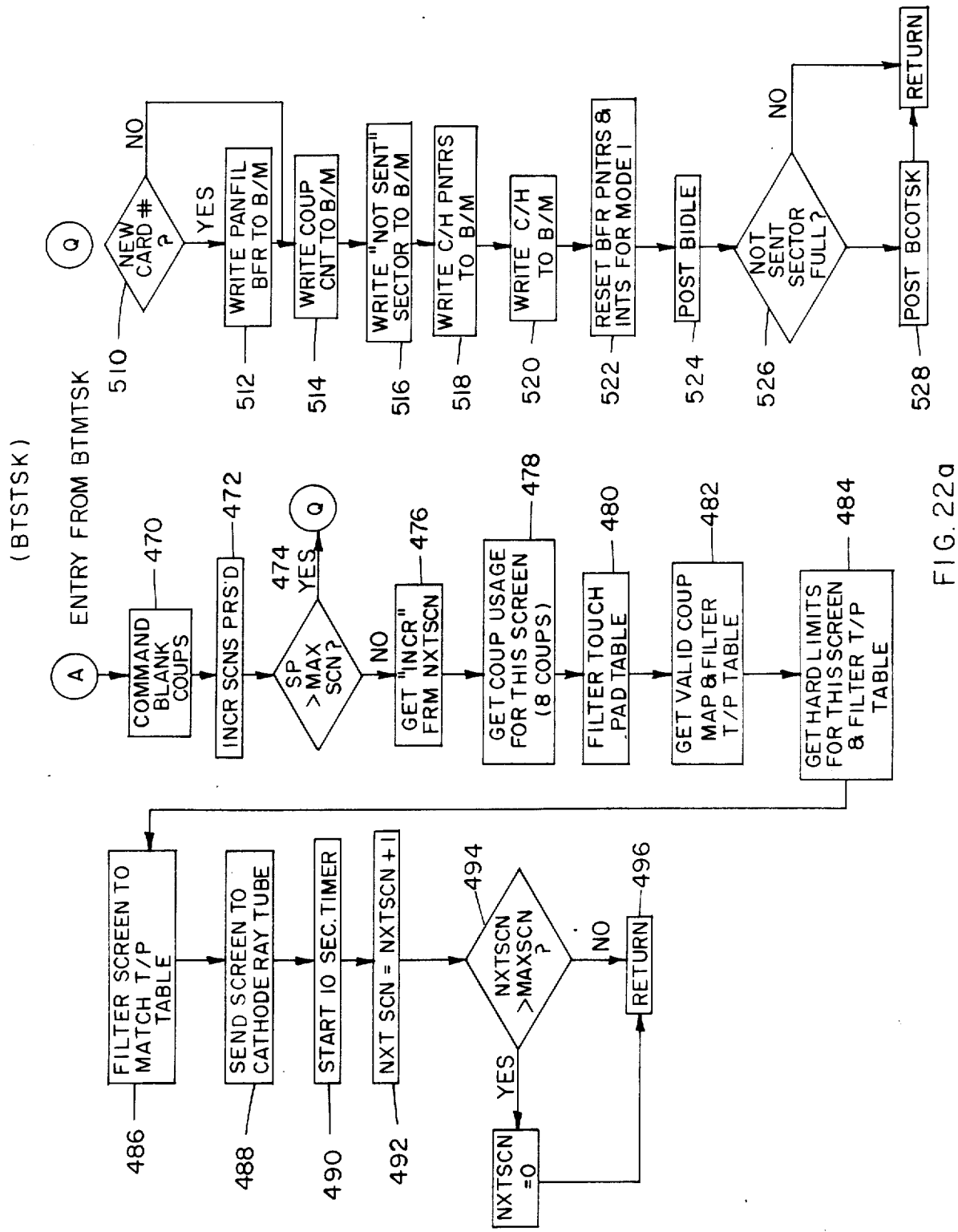
Figure 22C:
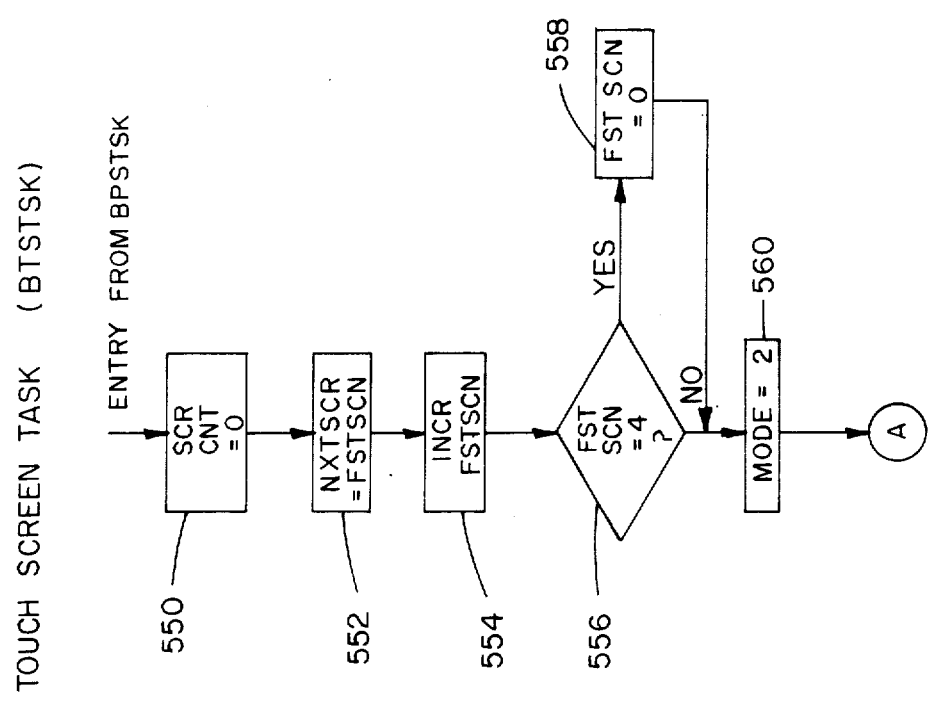

This background task sequence has three entry points and for ease of reference is illustrated in separate FIGS. 22a, 22b and 22c, respectively. The first entry from task BTMTSK (FIG. 23), is used to mask previously dispensed coupons from the touch screen and cathode ray tube display and to send the modified display to cathode ray tube 28. The record entry from background task FTSINT (FIG. 13, step 250) is used for causing microcomputer 22 to accept touch screen entries, and the third entry, from background task BPSTSK, is used for initializing sequence pointers to rotate the order of appearance of the screens to the customer.

When control of microcomputer 22 is transferred to this sequence from sequence BTMTSK, entry is at step 470 (FIG. 22). Step 470 causes microcomputer 22 to display a background of blank coupons on cathode ray tube 28 which will be completed with alpha numerics at step 488 and transfers control to step 472. Step 472 causes microcomputer 22 to increment a "screens presented" counter so that only the correct number of screens will be presented to the customer on any given transaction. On the first execution the increment will be from zero to one, and so on until the maximum number has been reached. Control is then transferred to step 474 which causes microcomputer 22 to test the screens presented counter versus the prescribed maximum, and if the maximum number has been exceeded treats the transaction as a "quit" request, as described below. If the maximum number of screens have been presented, control of microcomputer 22 is transferred from step 474 to sub-sequence Q (FIG. 22a) which will be described below. If all the screens have not been presented to the customer, control is transferred from step 474 to step 476 to continue the display sequence. Control is transferred sequentially from step 476 through step 484 to cause microcomputer 22 to determine which screen is to be displayed next (476) and to filter the displayed video for the cathode ray tube and the touch screen to eliminate any coupons no longer available for selection.

Step 476 causes the microcomputer 22 to determine which screen of coupons is to be displayed next by reading the "NXTSCN" counter, then transfers control to step 478 which causes the microcomputer to retrieve from memory the coupon history for this customer and this screen of coupons then transfers control to step 480. Step 480 causes microcomputer 22 to compare the coupon usage to the prescribed coupon per customer limit and filter or remove any coupons which are not available by disabling the corresponding touch pads. Control is then transferred to step 482 and 484 which similarly cause microcomputer 22 to eliminate any coupons which are invalid (step 482) by disabling or filtering the corresponding touch pad(s) and to similarly eliminate any coupons which are not available because weekly or other periodic maximum limits (as distinguished from per customer limits) have been attained (step 484).

Control of microcomputer 22 is then transferred to step 486 which causes microcomputer 22 to filter the video screen of coupons to match the modified touch pad array or touch screen so that unavailable coupons will not be displayed. Control is then transferred to step 488 to initiate display of the alpha numeric characters on the background of blank coupons (step 470) for each valid, available coupon on cathode ray tube 28. Control is transferred to steps 490 and 492 which cause microcomputer 22 to start the ten second timer for displaying the screen of coupons (490) and to increment the next screen counter. Control then transfers to loop 494 which causes microcomputer 22 to reset the next screen counter to zero once the total available screens have been displayed prior to returning (496) control to executive sequence E.

When BTSTSK is entered from the touch screen interrupt sequence FTSINT, control of microcomputer 22 is transferred to step 500 (FIG. 22b). Steps 500 through 508 cause the microcomputer to determine the nature of the touch screen input and transfer control appropriately.

If the touch screen input is a next screen request (step 500) control is transferred to BTMTSK entry A (FIG. 22a) to cause the next screen of coupons to be displayed immediately. If the touch screen input is a hold request (step 502) control is transferred to step 503 to cause the microcomputer 22 to reset the coupon display timer (step 490, FIG. 22a) to permit the present coupon screen to be displayed another ten seconds. If the touch screen input is determined to be a pad error, i.e., a malfunctioning touch screen pad (step 504) control is transferred to step 505 to cause microcomputer 22 to record the malfunction in an appropriate register and return to the executive sequence E.

If the customer has touched an invalid pad, i.e., one underlying a blank space on the display (step 506) control is returned to the executive sequence E since further action is unnecessary. Finally, if the touch screen input is a quit request, (step 508) control is transferred to sub-sequence Q (FIG. 22a).

Upon entry to sub-sequence Q, either from step 508 at the customer request or from step 474 when all screens have been displayed and selection completed, sequence Q causes microcomputer to perform the following end of transaction functions:

i. Write the primary account number data from random access memory file to non-volatile bubble memory 56 if this transaction was initiated with a new account number (steps 510, 512);
ii. Update the coupon counter in non-volatile memory 56 (step 514);
iii. Update the not sent sector, i.e., the transaction data not yet sent to host H, in non-volatile memory 56 (step 516);
iv. Update the coupon history increments or pointers in non-volatile memory 56 (step 518);
v. Update the coupon history sector in non-volatile memory 56 (step 520);
vi. Reset the buffer pointers, disable the touch screen interrupt, and enable the card reader interrupt to place the terminal in mode 1 condition, i.e., ready to be activated (step 522);
vii. Post the background idle task BIDLE and return to execute sequence E (step 524) unless the not sent sector of non-volatile memory is full (step 526) in which case background task sequence BCOTSK is posted (step 528) prior to returning to cause microcomputer 22 to take appropriate action.

Returning now to FIG. 22b, and assuming the touch screen input is a valid coupon selection input, control of microcompuer 22 passes to step sequence beginning with step 530 which causes the microcomputer 22 to initiate dispensing the selected coupon by queuing the selected coupon data into the printer output buffer and posting the printer output background sequence task BOTSK (steps 530, 532). Thereafter control is transferred to steps 536 and 538 which cause the microcomputer to disable the touch pad(s) corresponding to the selected coupon (step 536) and update the coupon history and counts in random access memory 58, 60 (step 538). Control is then transferred to steps 540 and 542 which cause the microcomputer 22 to determine whether the maximum number of this coupon have now been dispensed (step 540) and, if so, to correct the touch screen mask to clear the selected coupon from the video display (step 542). Control is then transferred to step 546 to set the display timer (FIG. 22a, step 490) to provide a ten second display of the available coupons then returned to executive sequence E.

Figure 23:
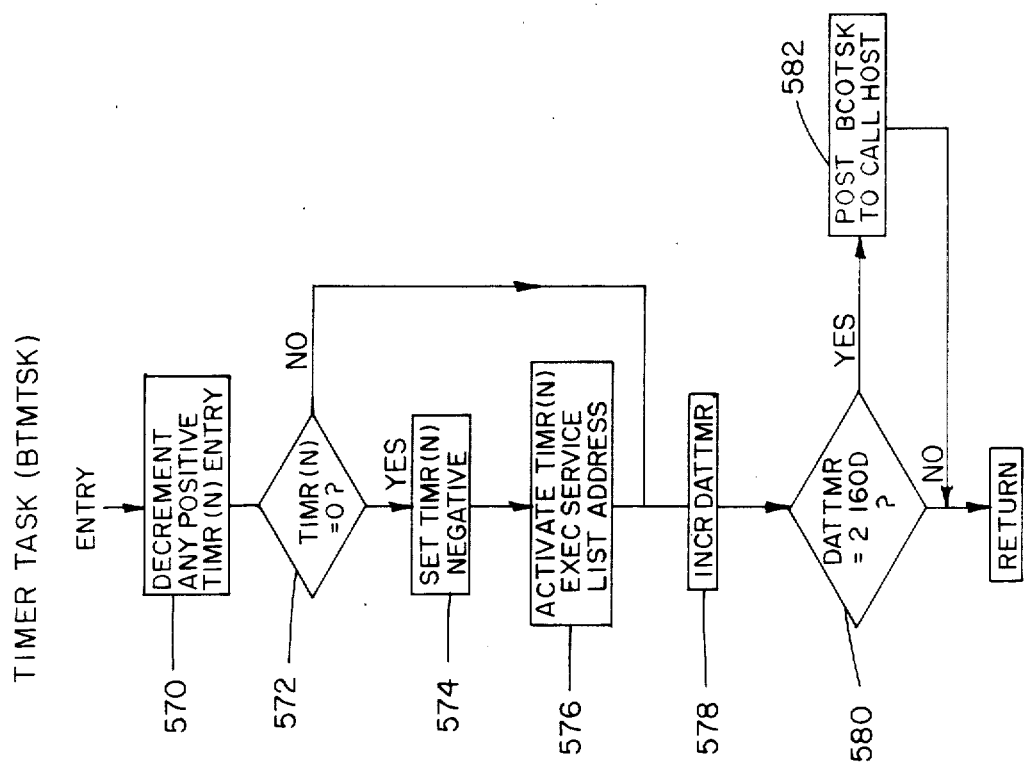

Entry into background touch screen task BTSTSK from task sequence BPSTSK (FIG. 21, step 462) causes control to be transferred to step 550 (FIG. 22c). This step sequence is simply an initialization sequence to cause microcomputer 22 to rotate the order of appearance of the coupon screens and initialize the screen counter (step 550), and next screen counter (steps 552, 554) prior to using background task sequence BTMTSK entry A (FIG. 22a) to display the appropriate screen of coupons. Note that steps 556 and 558 cause the microcomputer to determine whether the last screen, i.e., the fourth screen, has been displayed in this transaction (step 556) and, if so, reset the first screen counter to zero (step 558) which will cause the screen display sequence to begin anew. In either event, control is transferred to step 558 which sets the terminal operating mode to mode 2 to place the terminal in condition for a coupon transaction, prior to exiting in entry A in sequence BTMTSK (FIG. 22a).

d. Timer Task (BTMTSK) (FIG. 23)

This background task sequence (FIG. 23) is posted every second by the clock interrupt FCLINT (FIG. 12, step 234) and posts appropriate background task sequences if a timer has expired. In addition, time task BTMTSK also posts task BCOTSK at the time specified to initiate data transmission to the host H. All timed functions are listed in a timer register corresponding to the timed task. Each time the particular task is begun, the corresponding timer is set by the task sequence which provides an input value to the timer list. Entry into sequence BTMTSK causes control of microcomputer 22 to be transferred to step 570 which causes microcomputer 22 to decrement any positive timer entry.

Thereafter control is transferred to steps 572, 574 and 576 to cause microcomputer 22 to determine whether any of the listed timers have expired (step 572), and, if so, to set the timer to a negative value to prevent subsequent repetitive time outs (step 574) and to activate (step 576) the corresponding timer executive sequence task (FIG. 18) so that appropriate action may be taken. If no timer has expired, control is transferred from step 572 directly to step 578. Steps 578, 580 and 582 cause microcomputer 22 to increment the data transfer time which equals the elapsed time since the last transfer of coupon transaction data to host H (step 578), test the elapsed time versus the specified period for making scheduled data transmissions (step 580), and if the time has expired (step 582) post background task sequence BCOTSK which initiates a call to the host for data transmission. Thereafter control of microcomputer 22 is returned either from step 580 or 582 to the executive sequence E.

e. Printer Output Task (BPOTSK) (FIG. 24a)

Figures 24A, 24B:
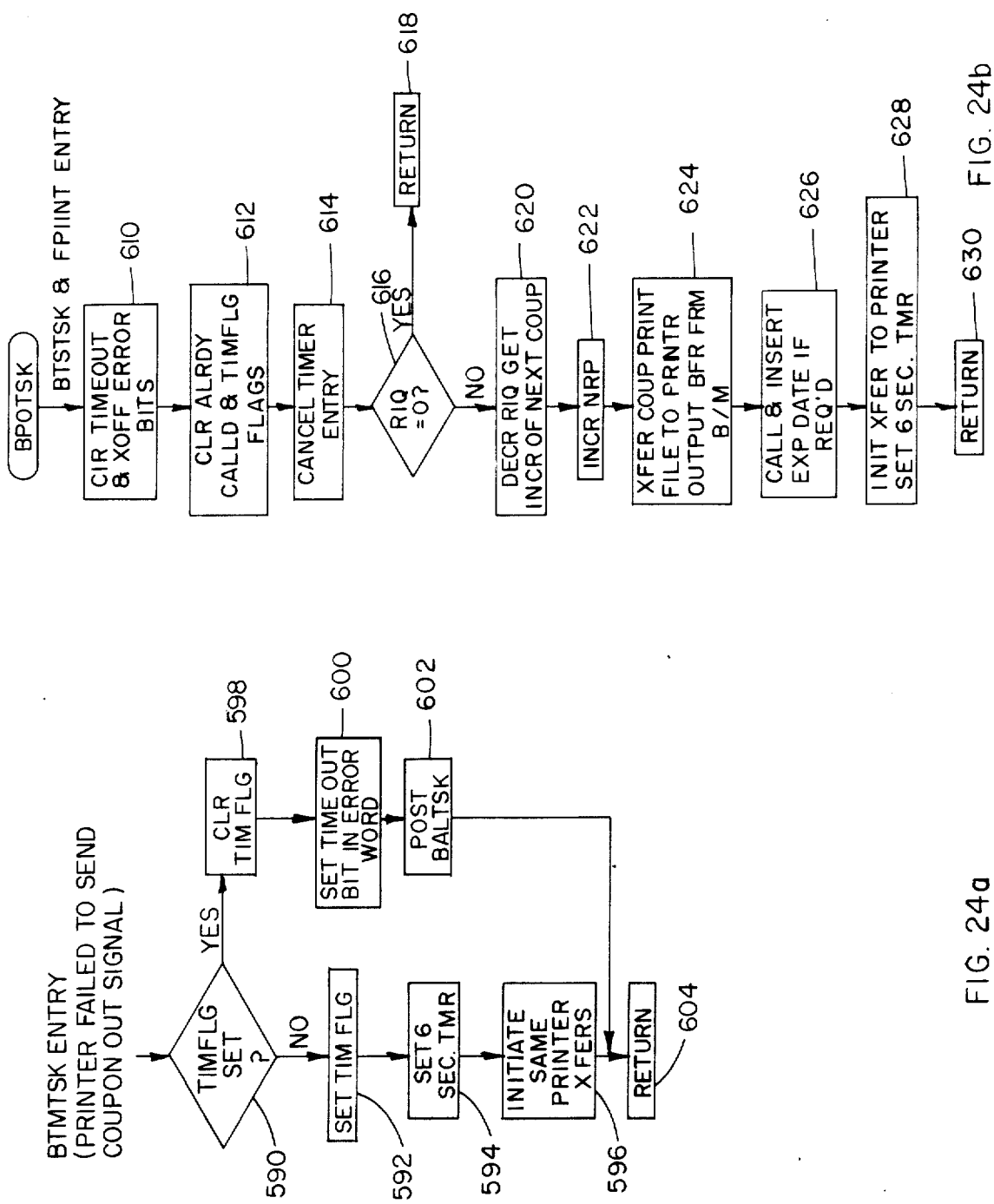

The printer output task BPOTSK may be posted from the BTMTSK sequence (FIG. 23, step 576) in which case entry is at the step sequence illustrated in FIG. 24a, or from the BTSTSK (FIG. 22b, step 532) or FPIINT (FIG. 15, step 284) sequences in which case entry is at the step sequence illustrated in FIG. 24b. Printer output task BPOTSK generally is used to cause the requested coupons to be printed and dispensed with the specified expiration date or other such data and to monitor printer errors.

Referring now to FIG. 24a, entry to BPOTSK from BTMTSK occurs when printer 32 has failed to send a coupon cut signal during a coupon dispensing transaction. The sequence illustrated in FIG. 24a causes microcomputer 22 to monitor printer 32 by providing a six (6) second time period for printer 32 to send the coupon cut signal indicating the transmitted coupon has been dispensed.

Upon initial entry into this sequence, control of microcomputer 22 is transferred to step 590. Step 590 causes microcomputer 22 to test the state of the timer flag. If the timer flag is not set, control of microcomputer 22 is transferred to steps 592-596 which cause microcomputer 22 to set the timer flag (step 592), prescribe a six second time limit (step 594) and initiate the same printer transfers (step 596). If, at step 590, the timer flag has already been set, an error message is required and control is transferred to steps 598-602 which cause microcomputer 22 to clear the timer flag (step 598), set the Time Out bit in the error word register (step 600) and post background task BALTSK (Step 602) to cause appropriate action to be taken regarding the error. Control is in either case returned (step 604) to the executive sequence.

If the entry into BPOTSK is from the touch screen task, BTSTSK, or from the printer interrupt task, FPIINT, control of microcomputer 22 is transferred to step 610 (FIG. 24b). This sequence is entered to initiate printer output such as to provide the customer with the selected and authorized coupons. Upon entry, steps 610-614 cause microcomputer 22 to clear time out and X off error bits from prior transactions (step 610), clear already called and timer flags likewise set from prior transactions (step 612) and to cancel the previous time entry (step 614).

Control is then transferred to step 616 which causes microcomputer 22 to test the printer queue to determine if any coupons remain to be printed. If not, no further action is required and control is returned (step 618) to the executive sequence.

If, on the other hand, coupons remain in the printer queue to be printed, control of microcomputer 22 is transferred from step 616 to steps 620-628 which cause the microcomputer to decrement the remaining in queue variable and retrieve the next increment of coupon data (step 620), increment the next read pointer to point to the address of data which comprises the next coupon to be printed in accordance with the customer's request, (step 622), transfer the coupon print file to the printer output buffer from non-volatile memory 56 (step 624), insert extra data such as an expiration date data is requested (step 626), and initiate transfer of the data to printer 32 under a six second time limit (step 628). The transaction is then completed and control is returned to the executive sequence (step 630).

f. Alarm Task (BALTSK)

Alarm task BALTSK is posted in response to terminal malfunctions or alarm conditions such as from the printer input interrupt sequence FPIINT (FIG. 15, step 296), the card reader interrupt sequence FCRINT (FIG. 10, step 188), or the printer output task BPOTSK (FIG. 24a, step 602). Alarm task BALTSK causes the microcomputer 22 to initiate a call to the host H and, in some circumstances place the terminal T in a disabled, hide and watch mode.

Upon entry into the BALTSK sequence, control of microcomputer 22 is transferred to a series of interrogatory steps (632-636) which cause microcomputer to determine whether the cause of entry was a X off error (step 632), a time out error (step 634), or a low paper error (step 636). If either a X off or time out error is detected, indicating printer failure, control is transferred to step 638 to cause microcomputer 22 to initiate a call to the host and place the terminal in the disabled, hide and watch mode.

Step 638 causes the microcomputer to determine whether the host has already been called by reading an appropriate flag, and if so returns (640) control to the executive sequence in the disabled mode. If the call has not been made, control is transferred to steps 642-648 which cause the microcomputer to set the already called flag (step 642), post call out task BCOTSK (step 644), set the terminal mode to the disabled, hide and watch mode (step 646), and set a sixty (60) second time for printer output task BPOTSK to schedule evaluation in sixty seconds (step 648). Control is then returned (step 680) to the executive sequence in the disabled mode.

g. Data Transmission to Host H

Control sequences for microcomputer 22 cause the microcomputer to initiate calls from terminal T at regularly scheduled times, i.e., every six hours, and whenever the full capacity in non-volatile memory 56 allocated for coupon history data is exhausted. Since the host H may only have a limited number of communication lines, so that a particular terminal T may receive a busy signal when a call is attempted, control sequences are provided to redial at the expiration of a fixed time period, e.g., 45 or 60 seconds.

Each time terminal T completes a call to host H, microcomputer 22 will cause the terminal T to send all coupon history information from memory 56 to the host H. The host H will recognize the data from a particular terminal T and record and segregate the data which comprises the particular terminal's coupon history so that it may be accessed by terminal identification number.

After all the coupon history data has been sent, microcomputer 22 will cause terminal T to transmit the coupon count data which is the cumulative count of coupons dispensed by the terminal during the reporting period by coupon type. The terminal's mode and error messages will also be transmitted. Each terminal will also originate a call to the host whenever there has been power-up reboot, or low paper, X off or time out condition at the printer. Coupon transaction data will be transmitted to the host H on these occasions also.

h. Communications Output Task (BCOTSK)

Figure 25:
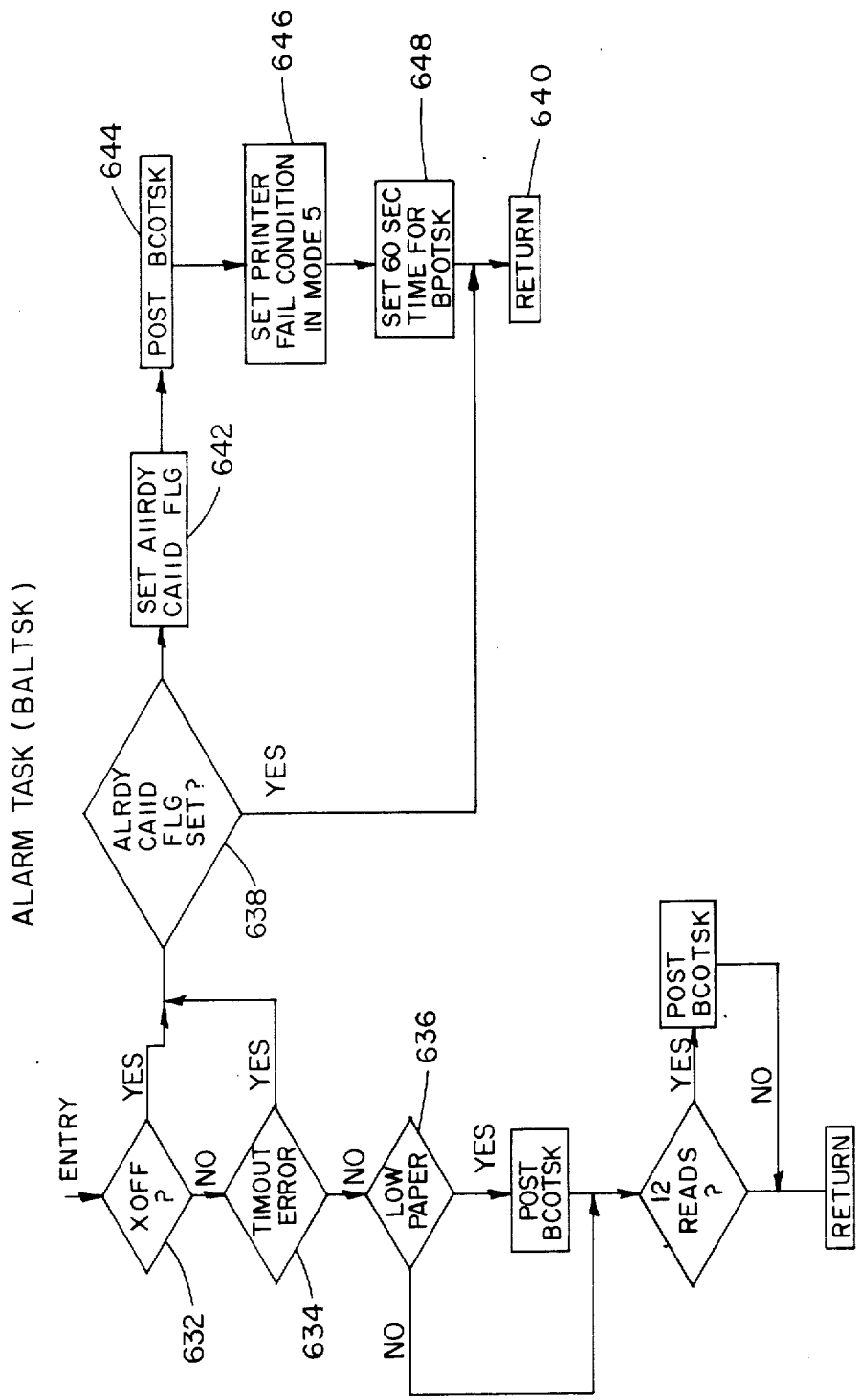
Figure 27A:
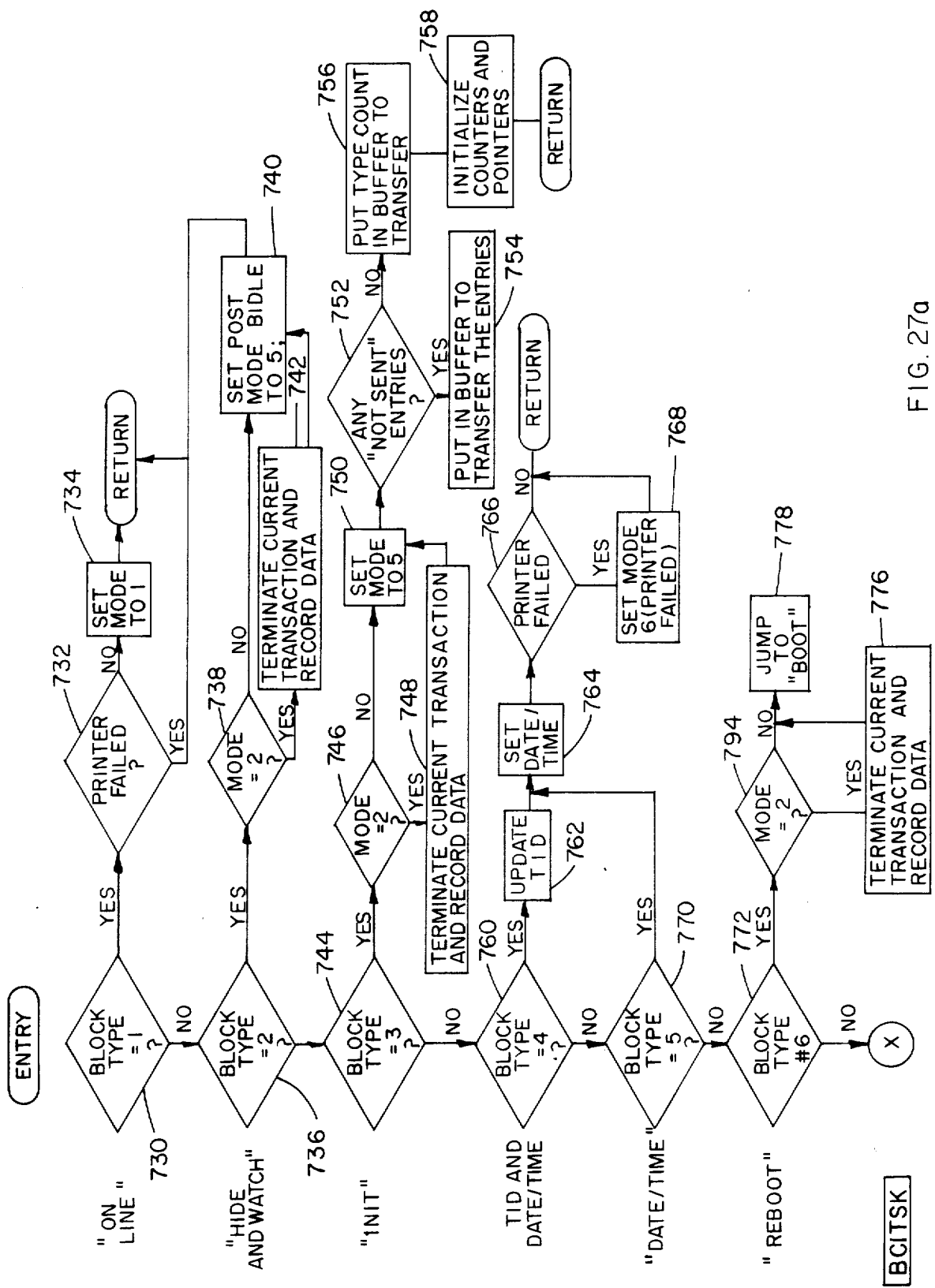
Figure 27B:
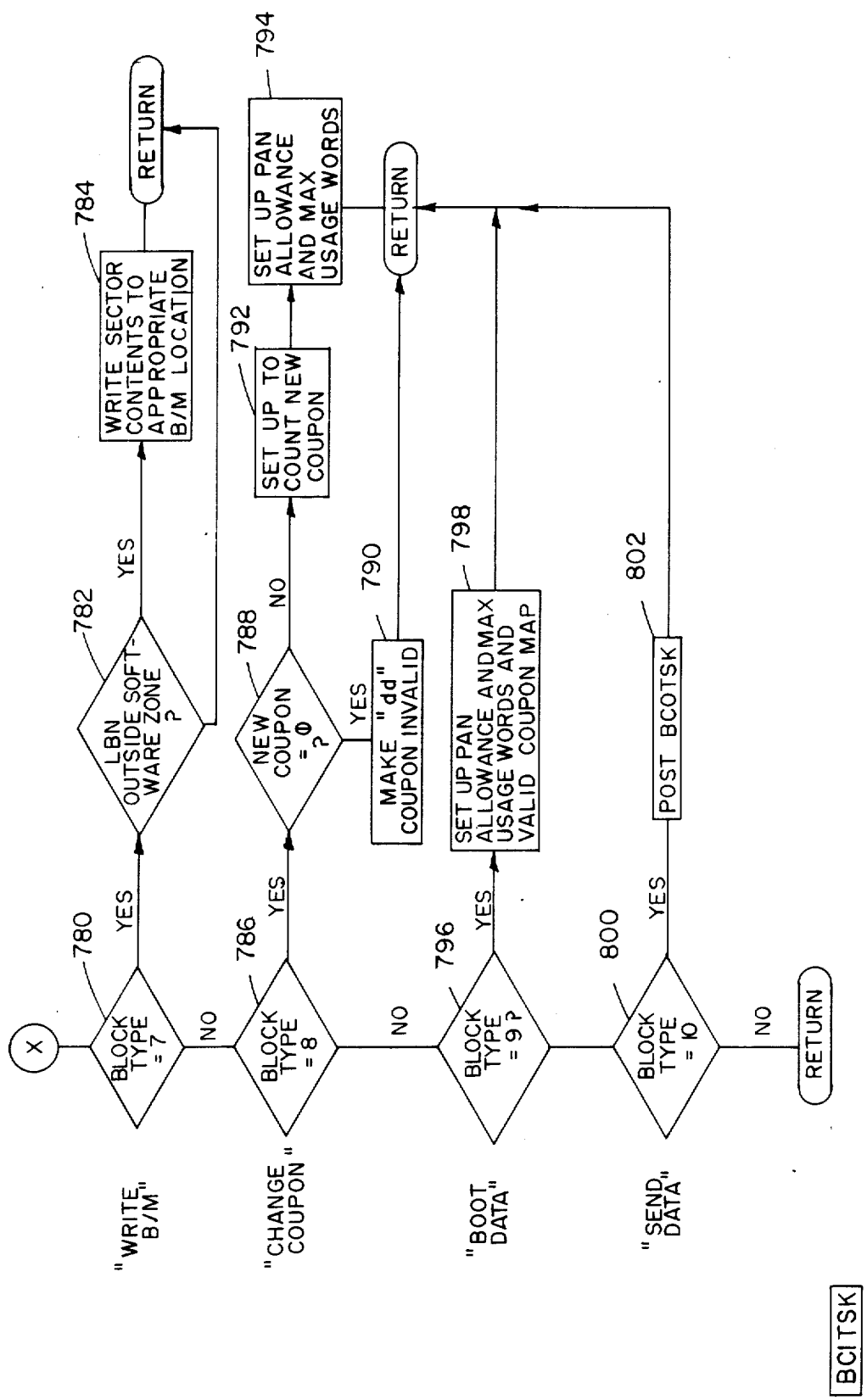

The communications output task will be posted to initiate transfer of data from terminal T to host H in one of six ways:

1. When the not sent buffer of terminal T which stores coupon transaction data not yet sent to host H (FIG. 22a, step 528) is full, microcomputer 22 causes terminal T to indicate transfer of coupon history data and coupon counts one sector at a time from the not sent buffer;

2. By foreground communications output interrupt FCOINT to initiate the transfer of the next sector of coupon data (FIG. 16, step 336);

3. By background alarm task BALTSK to initiate a call to host H to report a printer or card reader failure (FIG. 25, step 644);

4. By the power up sequence P (FIG. 19, step P1; FIG. 6, step 76) to obtain current date/time prior to assuming on-line, ready condition;

5. By the background end of day task BEDTSK (FIG. 28, step 816) for housekeeping transmissions; and, 6. By background communications interrupt task BCIITSK in response to a request from the host (FIG. 27b, step 802).

Each communicated data sector includes a type block which identifies the type of communication. In the illustrated embodiment, types 1–12 are communications from host H, types 20–26 are from terminal T to host H and type zero is either way.

Terminal block types may, for example, include the following:

1. Type 20: Not sent coupon history data consisting of up to seven coupon histories updated by terminal transactions;
2. Type 21: Coupon type count of the number of coupons of each coupon type issued since the last reset; may also include various error words;
3. Type 22: Date/time request calls host after reboot to obtain date/time;
4. Type 23: Printer failure, i.e., the terminal printer has an error condition which has caused microcomputer 22 to place printer 32 in the disabled mode;
5. Type 24: Low paper in printer.
6. Type 25: Excess card reader errors, indicative that there have been twelve bad reads from card reader 36;
7. Type 26: End of day transmission, where coupon type counts are sent as final, and daily counts are reset.

Host to terminal block types may include the following:

1. Type 1: Commands terminal T to go to ready mode; terminal obeys if printer not failed;
2. Type 2: Commands terminal T to go to disabled, hide and watch mode;
3. Type 3: Commands terminal to prepare for coupon data update by going to disabled mode, transferring current not sent histories and coupon counts, and reset account file, history file pointers and counters;
4. Type 4: Commands terminal to alter terminal identification and date/time, in response to terminal request;
5. Type 5: Same as 4 except no change in terminal identifier;
6. Type 6: Commands terminal to reboot, used to update coupon data;
7. Type 7: Commands terminal to write transmitted date into non-volatile memory;
8. Type 8: Commands terminal to modify coupon count assignment, and to change the maximum number of a particular coupon to be dispensed;
9. Type 9: Provides terminal with beginning limits for dispensing coupons;
10. Type 10: Requests that terminal T send not sent histories and coupon count data.

The host H may transmit data to the terminal T at any time during a connection by changing a communications block type recognized by the terminal to signal a type of host command. Terminal T will receive these commands and accomplish the specified tasks.

Figure 26:
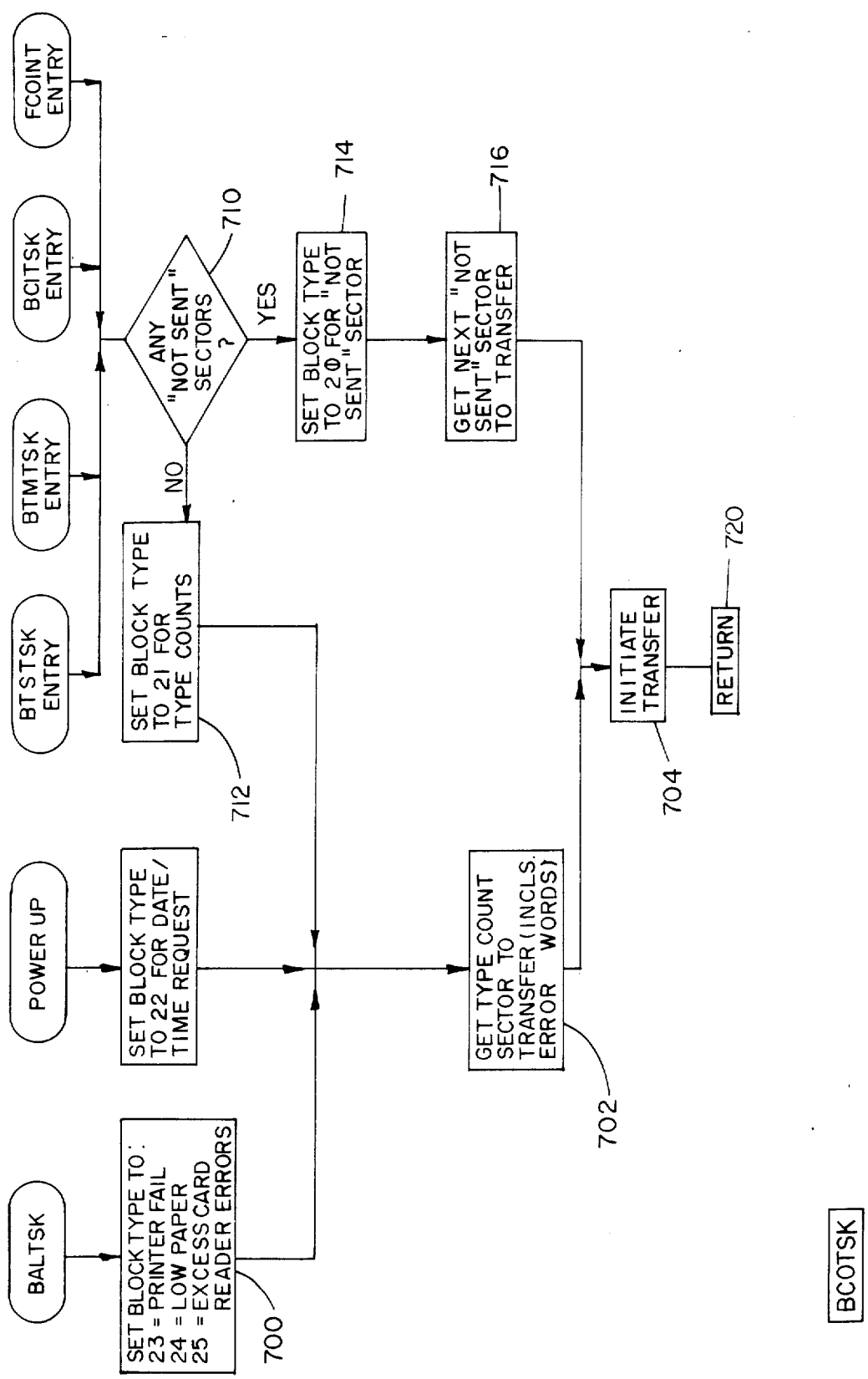

Having these general communications types in mind, the background communications output task BCOTSK illustrated in FIG. 26 is readily understood. Control of microcomputer 22 will be transferred to BCOTSK sequence as a result of one of the six posting possibilities. If entered from sequence BALTSK control is transferred to step 700 which causes the microcomputer 22 to set the type block which corresponds to the particular alarm or error condition, and transfers control to step 702. Step 702 causes microcomputer 202 to get the type count information from memory and transfers control to step 704 to initiate the data transfer.

If entered after power up, control is transferred to steps 706, 702 and 704 which causes microcomputer 22 to set the type block to type 22 to request the host to provide date/time information (706), get the coupon count information (202) and initiate the transfer (704).

If entered from any of the remaining four possibilities (FIG. 26) control is transferred to step 710 which causes microcomputer 22 to determine if there are any not sent history sectors in the buffer and if not transfers control to steps 712, 702 and 704 which cause microcomputer 22 to set the type block for type counts (712), get the type count data (702) and initiate the transfer (704).

If on the other hand, at step 710, it is determined that there are not sent coupont history sectors, control is transferred to steps 714, 716 and 704 to set the not sent type block (714), get the next not sent sector to transfer (716) and initiate the transfer (704). After each sequence control is returned (720) to the executive sequence.

i. Terminal Control Via Host-Communication Input Task (BCITSK) (FIG. 27)

The communications input task BCITSK is posted whenever an error free input communication is received from host H so that microcomputer 22 will cause terminal T to interpret the message and comply with the host commands. With the above enumerated block types designated to identify particular commands, the input task sequence is simply a series of interrogatories to identify block type and cause the terminal to carry out the commands accordingly.

Referring now to FIG. 27, upon entry to BCITSK, control is transferred to step 370 which evaluates the command block type, and, if block type 1, transfers control to steps 732 and 734 which cause microcomputer 22 to place the termianal in the ready, on line mode (step 734) unless printer 32 has failed (step 732) in which case the command to go to ready is ignored.

If the communication is a block type 2, control will be transferred through step 730 to step 736 and then steps 738–742. Steps 738–742 cause microcomputer 22 to determine whether a coupon transaction is in progress (step 738), and, if so, terminate the transaction (step 742), but in any event, places the terminal T in the disabled, hide and watch mode (step 740).

If the communication is a block type 3, control will be transferred through steps 730 and 736 to step 744 and then to step 746–758 as is appropriate. Steps 746–750 cause microcomputer 22 to terminate any coupon transactions in process, and go to the disabled mode. Steps 752 and 754 cause microcomputer 22 to send any not sent coupon histories. Step 756 and 758 cause microcomputer 22 to send the type counts and initialize internal counters and pointers.

If the communication is a type 4, control is transferred to step 760 and then to steps 762–768 which cause microcomputer 22 to update the terminal identifier (stpe 762), set the date/time data (step 764), determine if a printer failure has occurred (step 766) and, if so, set the appropriate printer failure mode 6 flag (step 768).

If the communication is a type 5, control is transferred to step 770 and then to step 764–768 as described above thereby causing microcomputer 22 to obtain date/time data and perform a printer error check without changing the identifier for terminal T.

If the communication is a type 6, control is transferred to step 772, then to steps 774–778 which cause microcomputer 22 to terminate any coupon transactions in process (steps 774–776) and transfer control to the boot, block type 11 sequence.

Type 7 communications cause control to be transferred to step 780 and then to steps 782–782. Type 7 is a non-volatile memory write command and steps 782 and 784 cause microcomputer 22 to prevent writing in the addresses reserved for the operating system (step 782) but otherwise to write the new data as instructed (step 784).

Type 8 communications cause control to be transferred to step 786 and then to steps 788–794 as is appropriate. Steps 788 and 790 cause the microcomputer 22 to invalidate a current coupon if the host specifies a zero allotment, and steps 792–794 otherwise cause existing coupon allotments to be adjusted according to the command.

Type 9 commands cause control to be transferred to step 796, and then to step 798 to cause microcomputer 22 to boot in or load the data being transferred from the host H to set up new coupon allotments and account allotments and to receive a new coupon array for display.

Type 10 commands are requests for the terminal T to call the host H and cause control to be transferred to step 802 to post the BCOTSK sequence to initiate the call. After each communication is evaluated and executed control is returned to executive sequence E.

j. End of Day Task (BEDTSK)

Figure 19:
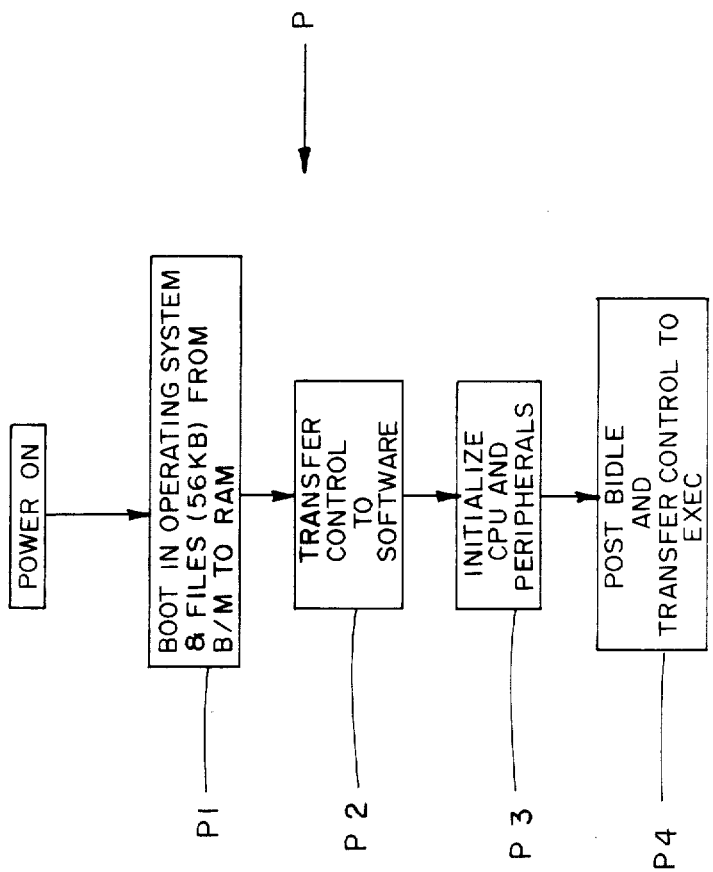
Figure 28:
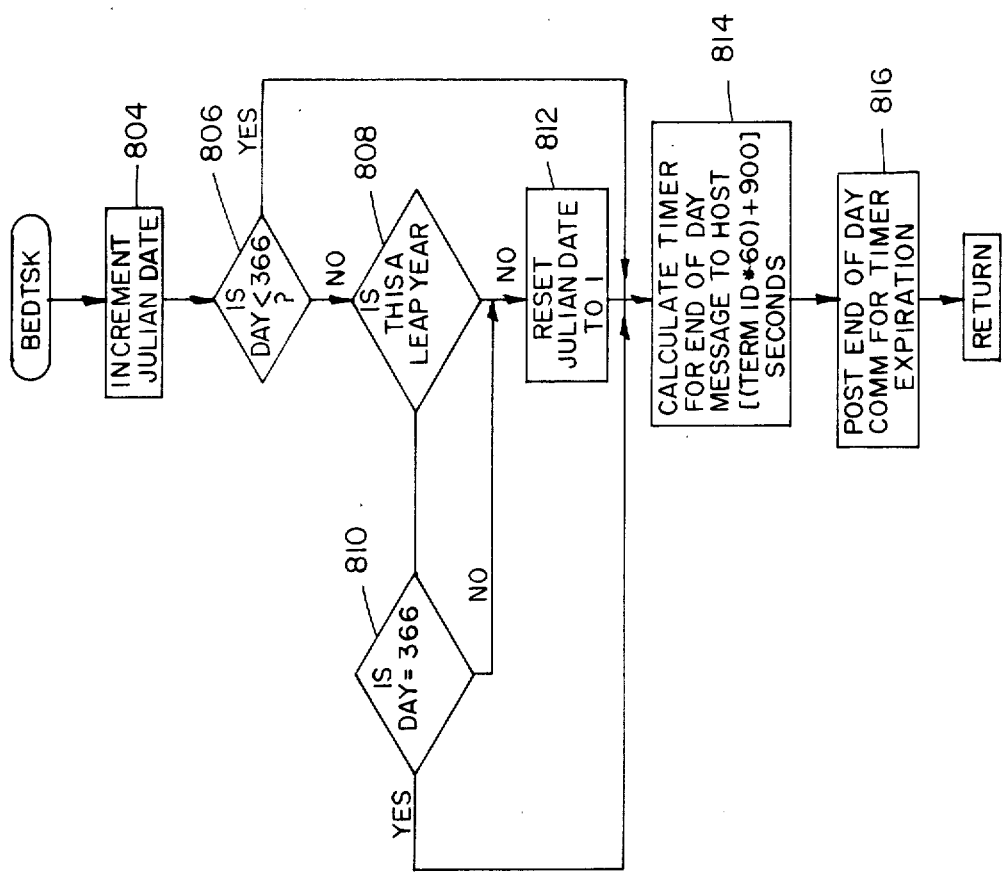

In addition to those service programs or tasks listed in FIGS. 5 and 19, an end of day background task illustrated in FIG. 28 is provided to cause terminal T to perform certain housekeeping chores at the end of each operating day. This task sequence is posted by the timer task, BTMTSK, at the expiration a of twenty-four hour period plus ninety seconds.

Referring now to FIG. 28, upon entry control of microcomputer 22 is transferred to step 804 which causes microcomputer 22 to increment the Julian date to the next day. Thereafter, control is transferred to step sequence 806–812 which cause microcomputer 22 to reset Julian date to 1 at the end of the year, i.e., the 366th day, unless the current year is a leap year. Control is then transferred to steps 814 and 816 which causes microcomputer 22 to reset the end of day timer (step 814) and initiate an end of day call to the host (step 816). Control is then returned to the executive sequence E.

Since implementation of a command control sequence for the host H, given the specifications for terminal T and the communications format contained herein is a matter within the ordinary skill in the art, detailed programming sequences for host H need not be provided herein.

V. Conclusion

The system of the present invention thus provides an unattended stand alone terminal T for controlling and monitoring the distribution of coupons at a remote location in cooperation with a centrally located host computer H. Once the terminal T is energized and operating it monitors and controls the printing and distribution of coupons in accordance with prescribed operating criteria, coupon limits and customer requests. The terminal T displays and automatically rotates free standing advertisement screens between customer transactions and when in a disabled mode. The terminal T may be activated to the coupon dispensing mode by any customers having a common credit card bearing a primary account number encoded on magnetic tape. In response to a valid activation, terminal T displays only those coupons available for selection to the customer at that time. The data encoded upon the coupons which are dispensed provides the manufacturer with a means to monitor and control fraudulent redemption. Customer account numbers and coupon transaction data are recorded, identified and automatically transferred to the host at periodic intervals.

While the preferred embodiment of this invention relates to manufacturers' coupons, it should be understood that other segments of information which can be displayed and withdrawn from a terminal by choice and which need to be controlled as to information continued and in number of dispensed segments are within the scope of the distribution system disclosed herein and hereinafter claimed.

In addition, host H is programmed to accommodate coupon dispensing history from each terminal on a terminal-to-terminal basis as well as a particular coupon-by-terminal and coupon by all terminals basis. Recording of this information on a periodic basis provides the host with the available information to provide meaningful coupon history reports to manufacturers which can be used to verify actual coupon redeemed information as well as provide meaningful market information on a per store, per terminal, per all terminal basis.

The foregoing disclosure and description of the invention are illustrative and explanatory thereof, and various changes in the size, shape and materials, as well as in the details of the illustrated construction may be made without departing from the spirit of the invention.

We claim:

1. A systen for controlling the selection and dispensing of product coupons at a plurality of remote terminals located at predesignated sites such as consumer stores wherein each terminal comprises:
   activation means for activating such terminal for consumer transactions;
   display means operatively connected with said activation means for displaying a plurality of coupons available for selection;
   selection means operatively connected with said display means provided to permit selection of a desired displayed coupon by the consumer;
   print means operatively connected with said selection means for printing and dispensing the coupon selected by the consumer; and
   control means operatively connected with said display means for monitoring each consumer transaction and for controlling said display means to prevent the display of coupons having exceeded prescribed coupon limits.

2. The system of claim 1, wherein said activation means comprises means for reading encoded consumer identifier cards, and means, responsive to said card reading means, for providing a terminal display activation signal.

3. The system set forth in claim 2, wherein:
said control means includes means for preventing the display of particular coupons in response to activation by a particular credit card.

4. The system set forth in claim 2, wherein said control means includes:
coupon limit means for prescribing a maximum distribution number for each coupon to set a limit on the number of that coupon that is dispensed from a given terminal in a particular time period; and display masking means for preventing the display of those coupons for which the prescribed distribution limit has been attained.

5. The system set forth in claim 4, wherein said selection means includes
a touch sensitive screen comprising an array of touch sensitive elements and mounted with said display means for permitting a customer to select a particular displayed coupon by touching said elements of touch sensitive screen at points aligned with the particular coupon; and wherein said control means further comprises touch screen disabling means for disabling those elements of said touch screen aligned with masked coupons.

6. The system set forth in claim 2, wherein said control means further comprises:
transaction storage means for storing a record of each transaction, said transaction record including a customer account identification number and data reflecting the type and number of coupons dispensed in the particular transaction.

7. The system set forth in claim 6, wherein said control means further comprises:
means for prescribing a particularized per account limit for each coupon;
means for comparing each customer account number read by said card reading means to the customer account numbers previously stored in said transaction storage means; and,
means for masking the display of any coupon for customer selection for which the per account limit number of coupons has been previously dispensed.

8. The system set forth in claim 6, wherein each of said terminals is connected to a centrally located data processing unit, and wherein each said terminal further comprises:
data transmission means for transmitting the stored transaction data to the central data processing unit.

9. The system set forth in claim 8, wherein said data transmission means further comprises:
means for automatically initiating the transmission of the transaction data at regular periodic intervals.

10. The system set forth in claim 8, wherein said data transmission means further comprises:
means for automatically initiating the transmission of the transaction data stored in said record storing means when the storage capacity of said record storing means is attained.

11. The system set forth in claim 10, wherein said record storing means further comprises:
means for recording the number of customer transactions for which no record is stored in said record storing means.

12. The system set forth in claim 1, including:
said control means interacting with said display means to provide a display of an array of individual coupons on a page formatted video menu.

13. The system set forth in claim 12, including:
said control means interacting with said display means for sequentially displaying a plurality of video menu pages.

14. The system set forth in claim 13, wherein said control means includes means for modifying the sequence in which said menu pages are displayed.

15. The system set forth in claim 12, further including:
said control means for said display means interacting to display video graphics other than coupons such as advertisements.

16. The system set forth in claim 12, including:
said control means and said display means interacting to automatically display each of said video menu pages for a particular time period.

17. The system set forth in claim 16, including:
said control means and display means interacting to provide means for holding a particular menu page in display format for an additional period of time.

18. The system set forth in claim 16, including:
said control means and display means interacting to provide the immediate display of the next menu in sequence.

19. The system set forth in claim 1, wherein:
said display means includes means for displaying an array of individual coupons on a selectable video page formatted menu and means for displaying a plurality of video menu pages in a particular sequence, each page being displayed for a particular time;
said selection means providing for the selection of a desired coupon includes a touch sensitive screen mounted with said display means allowing a customer to select a particular displayed coupon by touching said touch sensitive screen at points aligned with the particularly desired coupon.

20. The system set forth in claim 1, wherein said print means includes:
means for printing and dispensing a coupon bearing a product name, manufacturer, and the value of the coupon.

21. The system set forth in claim 1, wherein said print means includes:
means for printing and dispensing a coupon bearing an encoded unique store identification number, Julian date, and time of day.

22. The system set forth in claim 1, wherein said print means includes:
means for printing and dispensing a coupon bearing an expiration date.

23. The system set forth in claim 1, wherein said print means includes:
means for printing and dispensing a coupon bearing a machine readable uniform product code.

24. The system set forth in claim 1, wherein said print means includes:
means for providing a signal indicative of a printer failure; and
said control means includes means responsive to said printer failure signal for placing said terminal in a standby mode wherein said selection means is inoperable.

25. A system for controlling the selection and dispensing of product coupons at a plurality of remote terminals located at predesignated sites such as consumer stores, comprising:

a plurality of free standing coupon display terminals located at predesignated sites such as consumer stores, each of said terminals being adapted for bidirectional data communication with a host central processing unit;

each of said terminals comprising activation means for activating such terminals for consumer use by insertion of a credit card or other card having customer account information stored on a magnetic strip;

display means operatively connected with said activation means for displaying a plurality of coupons;

selection means operatively connected with said display means for providing for the selection of a desired displayed coupon by a consumer;

print means operatively connected with said selection means for printing and dispensing the coupons selected;

terminal control means operatively connected with said display means and print means for continuously monitoring each customer transaction and for controlling said display and print means in response to prescribed coupon limits;

means for storing consumer transactions and for periodically communicating customer transactions to said host central processing unit;

said host central processing unit including means for the transmitting to each terminal particular information for each coupon; and said host central processing unit further including means for periodically transmitting to each terminal coupon limits such as and including expiration date, and total number of coupons to be dispensed.

26. The system set forth in claim 25 wherein:
each of said terminals includes recording means operatively connected with said activation means and display means for recording each customer transaction and for communicating customer transaction information to said host computer.

27. The system set forth in claim 25, wherein said terminal control means includes:
means for preventing the display of a coupon in response to activation of said terminal by a customer if the limit number of coupons for that customer has been attained.

28. The system set forth in claim 25, wherein said printer means includes:
means for preventing the display of a coupon in response to activation of said terminal by a customer if the limit number of coupons for that terminal has been attained.

29. The system set forth in claim 25, wherein said terminal control means includes:
means for preventing the display of a coupon in response to activation of said terminal by a customer if the limit number of coupons for the system has been attained.

30. The system set forth in claim 25 wherein said terminal control means includes means for periodically communicating to said host central processing unit transaction information including customer account numbers, and an accounting of coupons printed and dispensed.

31. The system set forth in claim 25, wherein:
said host central processing unit includes means for compiling transaction information provided by each of said terminals and for reporting transaction information on a periodic basis for all terminals, for individual terminals and individual coupons.

* * * * *